United States Patent
Jo et al.

(10) Patent No.: US 11,645,915 B2
(45) Date of Patent: May 9, 2023

(54) METHOD OF DETERMINING VEHICLE ACCIDENT, SERVER DEVICE FOR PERFORMING THE SAME, AND VEHICLE ELECTRONIC DEVICE AND OPERATION METHOD THEREOF

(71) Applicant: Samsung Electronics Co., Ltd., Gyeonggi-do (KR)

(72) Inventors: Youngsuk Jo, Gyeonggi-do (KR); Hyunsik Ki, Gyeonggi-do (KR); Youngil Kim, Gyeonggi-do (KR); Junhong Kim, Gyeonggi-do (KR); Sanghoon Lee, Gyeonggi-do (KR); Honghoon Jang, Gyeonggi-do (KR); Hyeonhun Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/183,467

(22) Filed: Feb. 24, 2021

(65) Prior Publication Data
US 2021/0264789 A1 Aug. 26, 2021

(30) Foreign Application Priority Data
Feb. 24, 2020 (KR) .......................... 10-2020-0022378

(51) Int. Cl.
*G08G 1/16* (2006.01)
*H04W 4/44* (2018.01)
*G08G 1/01* (2006.01)

(52) U.S. Cl.
CPC .......... *G08G 1/164* (2013.01); *G08G 1/0112* (2013.01); *G08G 1/0133* (2013.01); *H04W 4/44* (2018.02)

(58) Field of Classification Search
CPC .... G08G 1/164; G08G 1/0112; G08G 1/0133; H04W 4/44
See application file for complete search history.

(56) References Cited

U.S. PATENT DOCUMENTS

| 9,830,823 B1 | 11/2017 | Chainer et al. |
| 11,129,000 B2 | 9/2021 | Kim |

(Continued)

FOREIGN PATENT DOCUMENTS

| EP | 2 271 522 B1 | 7/2018 |
| JP | 2005128671 | * 5/2005 |

(Continued)

OTHER PUBLICATIONS

European Search Report dated Jul. 21, 2021.
Korean Search Report dated Nov. 16, 2021.

*Primary Examiner* — Hongmin Fan
(74) *Attorney, Agent, or Firm* — Cha & Reiter, LLC

(57) ABSTRACT

According to an embodiment of the disclosure, a method of determining a vehicle accident comprises: receiving, from a vehicle, first information including a speed and a location of the vehicle for a communication period having variable value; obtaining second information including environment information of a trail of the vehicle; updating the communication period based on the first information and the second information such that a moving range of the vehicle during the communication period corresponds to a reference value; determining whether an accident involving the vehicle has occurred based on whether updated first information is received from the vehicle for the updated communication period; and transmitting a notification, responsive to determining an accident involving the vehicle.

16 Claims, 14 Drawing Sheets

(56) References Cited

U.S. PATENT DOCUMENTS

| | | | |
|---|---|---|---|
| 2015/0170436 A1 | 6/2015 | Stacy | |
| 2019/0035277 A1* | 1/2019 | Son | G08G 1/163 |
| 2019/0263393 A1* | 8/2019 | Han | G05D 1/0055 |
| 2019/0289446 A1 | 9/2019 | Kim | |
| 2019/0339082 A1* | 11/2019 | Doig | G01C 21/32 |

FOREIGN PATENT DOCUMENTS

| | | |
|---|---|---|
| JP | 2011-97293 A | 5/2011 |
| KR | 10-2004-0097605 A | 11/2004 |
| KR | 10-2009-0128958 A | 12/2009 |
| KR | 10-2010-0009355 A | 1/2010 |
| KR | 10-2013-0143185 A | 12/2013 |
| KR | 10-1413409 B1 | 6/2014 |
| KR | 10-2016-0066414 A | 6/2016 |
| KR | 10-2018-0063789 A | 6/2018 |

\* cited by examiner

| SPEED | 150km/h | 120km/h | 100km/h | 80km/h | 60km/h | 40km/h | 20km/h |
|---|---|---|---|---|---|---|---|
| PERIOD | 24s | 30s | 36s | 45s | 60s | 90s | 180s |

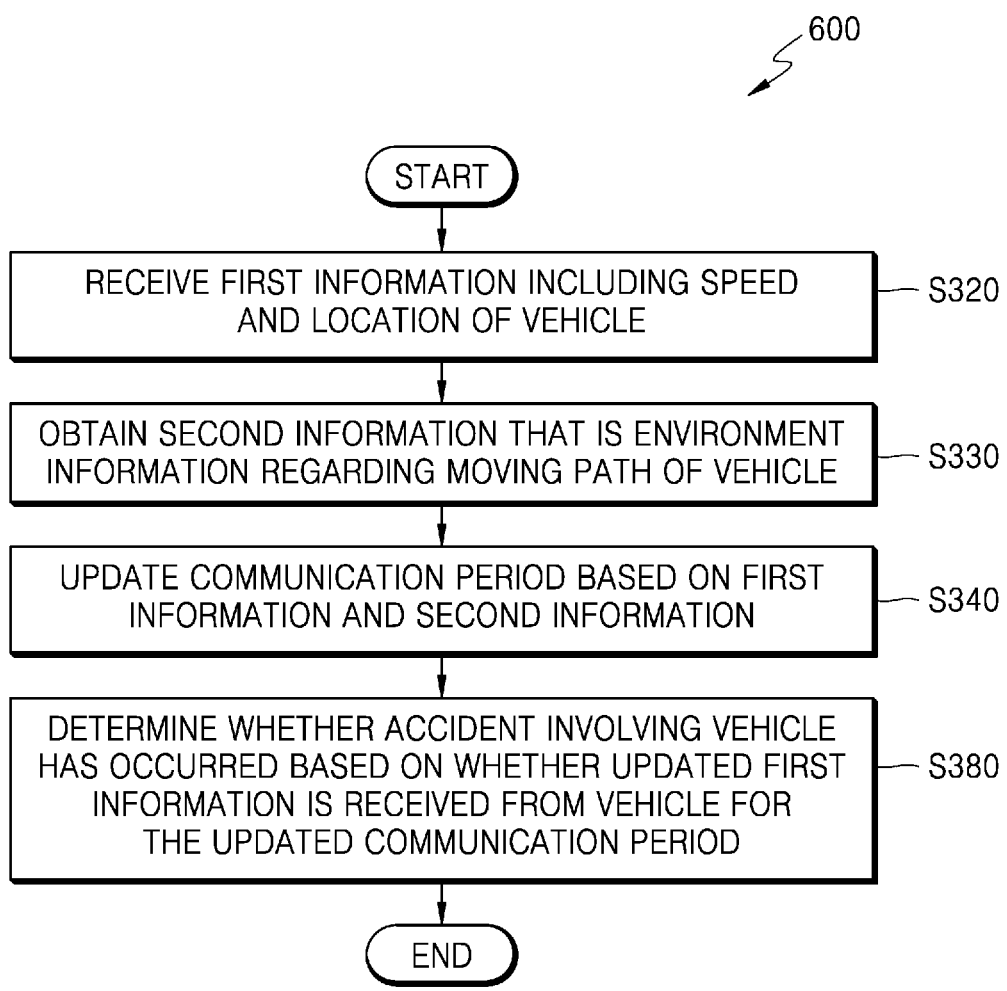

METHOD OF DETERMINING VEHICLE ACCIDENT, SERVER DEVICE FOR PERFORMING THE SAME, AND VEHICLE ELECTRONIC DEVICE AND OPERATION METHOD THEREOF

CROSS-REFERENCE TO RELATED APPLICATION

This application is based on and claims priority under 35 U.S.C. § 119 to Korean Patent Application No. 10-2020-0022378, filed on Feb. 24, 2020, in the Korean Intellectual Property Office, the disclosure of which is incorporated by reference herein in its entirety.

BACKGROUND

1. Field

The disclosure relates to methods of determining a vehicle accident, server devices for performing the methods, and vehicle electronic devices and operation methods thereof, and more particularly, to vehicle accident determination methods for determining whether an accident involving a vehicle communicating with a server has occurred, server devices for performing the methods, and vehicle electronic devices and operation methods thereof.

2. Description of Related Art

Vehicle accidents in the United States result in approximately 40,000 deaths every year, and 4.4 million injuries requiring medical attention. The time period immediately following a car accident is crucial. The provision of emergency medical services immediately following an accident can dramatically improve the chances of survival and prospect for recovery from any injuries.

Accordingly, it is to quickly and accurately determine whether an accident involving a vehicle has occurred.

SUMMARY

According to an embodiment of the disclosure, a method of determining a vehicle accident comprises: receiving, from a vehicle, first information including a speed and a location of the vehicle for a communication period having variable value; obtaining second information including environment information of a trail of the vehicle; updating the communication period based on the first information and the second information such that a moving range of the vehicle during the communication period corresponds to a reference value; determining whether an accident involving the vehicle has occurred based on whether updated first information is received from the vehicle for the updated communication period; and transmitting a notification, responsive to determining an accident involving the vehicle.

According to certain embodiments, the second information includes information about a driving environment on trail of the vehicle.

According to certain embodiments, the second information includes at least one of weather, presence of a shaded area, road conditions, information about occurrence of an accident, information about an accident-prone area, or information about driving conditions, which all correspond to the trail of the vehicle.

According to certain embodiments, the updating of the communication period comprises updating the communication period with a value that is inversely proportional to the speed of the vehicle such that the moving range of the vehicle during the communication period corresponds to the reference value.

According to certain embodiments, the updating of the communication period comprises: setting an initial communication period to a value that is inversely proportional to the speed of the vehicle such that the moving range of the vehicle during the communication period corresponds to the reference value; and setting a final communication period by applying a weight to the initial communication period based on the second information.

According to certain embodiments, the determining of whether an accident involving the vehicle has occurred comprises, when the updated first information is not received within the updated communication period, determining that an accident involving the vehicle has occurred.

According to certain embodiments, transmitting the notification comprises transmitting information about the occurrence of the accident to a first responder.

According to certain embodiments, the determining of whether an accident involving the vehicle has occurred comprises: determining whether the updated first information is received within the updated communication period; when the updated first information is not received within the updated communication period, requesting situation information from at least one nearby vehicle based on the first information; receiving the situation information from at least one of the at least one nearby vehicle; and determining, based on the situation information, whether an accident involving the vehicle has occurred.

According to certain embodiments, the situation information includes information indicating a driving environment on a trail of the at least one nearby vehicle.

According to certain embodiments, a server device comprises: a communicator configured to communicate with a vehicle; and a processor configured to execute at least one instruction to: update, based on first information including a speed and a location of the vehicle, received from the vehicle for a communication period having variable value, and second information that is environment information regarding a trail of the vehicle, the communication period such that a moving range of the vehicle during the communication period corresponds to a reference value, and control the communicator to transmit the updated communication period to the vehicle;

determine whether an accident involving the vehicle has occurred based on whether updated first information is received from the vehicle for the updated communication period; and transmit a notification, responsive to determining an accident involving the vehicle.

According to certain embodiments, the second information includes at least one of weather, information about a shaded area, road conditions, information about occurrence of an accident, information about an accident-prone area, or information about driving conditions, which all correspond to a trail of the vehicle.

According to certain embodiments, the processor is further configured to execute the at least one instruction to update the communication period with a value that is inversely proportional to the speed of the vehicle such that the moving range corresponds to the reference value.

According to certain embodiments, the processor is further configured to execute the at least one instruction to: set an initial communication period to a value that is inversely proportional to the speed of the vehicle such that the moving range of the vehicle during the communication period is maintained at a value corresponding to the reference value; and set a final communication period by applying a weight to the initial communication period based on the second information.

According to certain embodiments, the processor is further configured to execute the at least one instruction to: determine whether the updated first information is received within the updated communication period; when the updated first information is not received within the updated communication period, request situation information from at least one nearby vehicle based on the first information; control the communicator to receive the situation information from at least one of the at least one nearby vehicle; and determine, based on the situation information, whether the accident involving the vehicle has occurred.

According to certain embodiments, the server further comprising a database (DB) storing a plurality of reference values respectively corresponding to a plurality of speeds.

According to certain embodiments, the processor is further configured to execute the at least one instruction to calculate the communication period such that the moving range of the vehicle during the communication period corresponds to the reference value by receiving the first information and the second information and performing computation via a neural network.

According to certain embodiments, an operation method of a vehicle electronic device comprises: transmitting first information including a speed and a location of a vehicle to a server; receiving a value of a communication period from the server; and when the communication period arrives, transmitting the first information corresponding to a current time point to the server, wherein the communication period is a value set such that a moving range of the vehicle during the communication period corresponds to a reference value.

According to certain embodiments, a vehicle electronic device comprises: a communicator configured to communicate with a server; and a processor configured to execute at least one instruction to control the communicator to transmit first information including a speed and a location of a vehicle to a server, receive a value of a communication period, and when the communication period arrives, transmit the first information corresponding to a current time point to the server.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart of a method of determining a vehicle accident, according to an embodiment of the disclosure;

DETAILED DESCRIPTION

Figure 1:
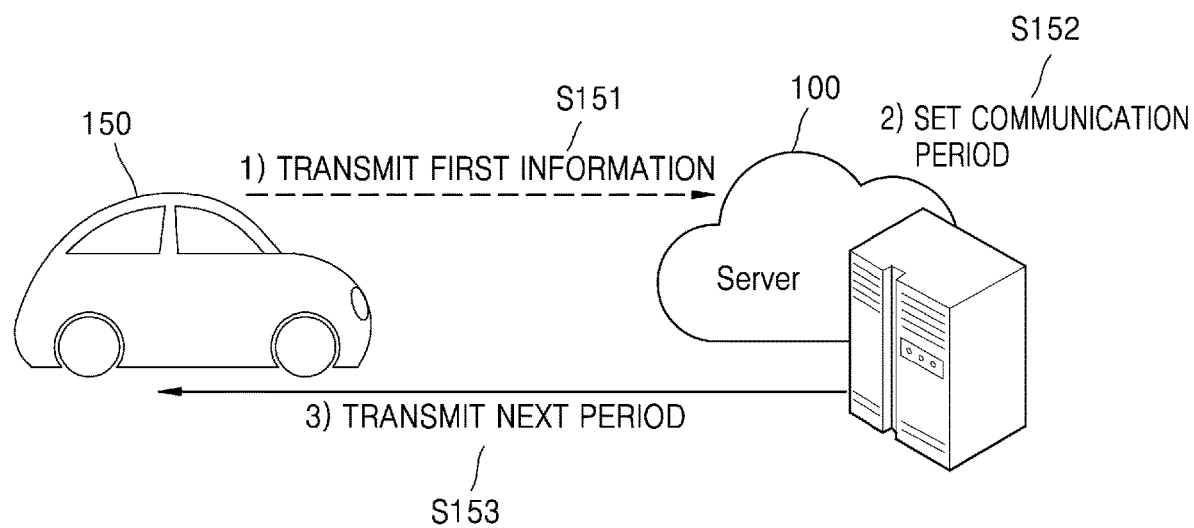
FIG. 1 is a diagram for describing communication between a server and a vehicle, according to an embodiment of the disclosure.

A module for alerting emergency services or the like may be installed in the vehicle to respond to a vehicle accident. The module may automatically or manually trigger an alarm when an emergency such as an accident occurs. The module may transmit the alarm to an external device or relief agency (e.g., a hospital or institution associated with disaster relief). The module may have embedded therein a SIM card and a global positioning system (GPS) device. The SIM card can automatically notify a first responder following a vehicle accident via phone call or other communication. The GPS device can provide location tracking.

Furthermore, a module can also allow a driver of the vehicle to manually connect directly to a relief agency and communicate the occurrence of the vehicle accident. For example, a driver may report a vehicle accident using his or her mobile phone. Alternatively, when a vehicle is equipped with a module that allows the vehicle to connect and communicate with a relief agency, a driver may report a vehicle accident after connecting and communicating with the relief agency via the module mounted in the vehicle.

However, such a module may not work if the module itself is damaged in the vehicle accident. As described above, when it is difficult for a vehicle or its driver to notify outside agencies about the occurrence of a vehicle accident, relief measures for the vehicle accident are delayed, and thus, the crucial time for rescuing the driver may be missed.

Accordingly, there is a need for a method and apparatus capable of quickly determining whether a vehicle accident has occurred under more circumstances.

Provided are methods of determining a vehicle accident, which are capable of quickly identifying an occurrence of a vehicle accident, server devices for performing the methods, and vehicle electronic devices and operation methods thereof.

In particular, provided are methods of determining a vehicle accident, server devices for performing the methods, and vehicle electronic devices and operation methods thereof, which allow an external agency or other people to quickly identify whether an accident involving a vehicle has occurred even when the vehicle is unable to notify the external agency about the occurrence of the accident.

Additional aspects will be set forth in part in the description which follows and, in part, will be apparent from the description, or may be learned by practice of the presented embodiments of the disclosure.

Embodiments of the disclosure will now be described more fully hereinafter with reference to the accompanying drawings so that they may be easily implemented by those of ordinary skill in the art. However, embodiments of the disclosure may have different forms and should not be construed as being limited to the embodiments set forth herein. Descriptions not related to embodiments of the disclosure will be omitted to clearly explain the embodiments thereof in the drawing, and like reference numerals denote like elements throughout.

Throughout the specification, it will be understood that when an element is referred to as being "connected" or "coupled" to another element, it can be "directly connected" to or ":electrically coupled" to the other element with one or more intervening elements interposed therebetween. Furthermore, when a part "includes" or "comprises" an element, unless there is a particular description contrary thereto, the part may further include other elements, not excluding the other elements.

Expressions such as "in some embodiments" or "in an embodiment" described in various parts of this specification do not necessarily refer to the same embodiment(s).

Some embodiments of the disclosure may be described in terms of functional block components and various processing operations. Some or all of such functional blocks may be implemented by any number of hardware and/or software components that perform particular functions. For example, functional blocks of the disclosure may be implemented by one or more microprocessors or by circuit components for performing intended functions. For example, functional blocks according to the disclosure may be implemented in any programming or scripting language. The functional blocks may be implemented using various algorithms executed on one or more processors. Furthermore, the disclosure may employ techniques of the related art for electronics configuration, signal processing and/or data processing. Terms such as "module" and "configuration" may be used in a broad sense and are not limited to mechanical or physical components.

Furthermore, connecting lines or connectors shown in various figures are intended to represent exemplary functional relationships and/or physical or logical couplings between components in the figures. In an actual device, connections between components may be represented by alternative or additional various functional relationships, physical couplings, or logical couplings.

Throughout the disclosure, the expression "at least one of a, b or c" indicates only a, only b, only c, both a and b, both a and c, both b and c, all of a, b, and c, or variations thereof.

Furthermore, in this specification, two or more components expressed using 'part (unit)', 'module', etc. may be combined into a single component, or one component may be divided into two or more components according to sub-functions. In addition, each of the components to be described below may additionally perform some or all of the functions that other components are responsible for in addition to its own main function, and some of the main functions that each component is responsible for may be performed exclusively by the other components.

Throughout the disclosure, the expression "at least one of a, b or c" indicates only a, only b, only c, both a and b, both a and c, both b and c, all of a, b, and c, or variations thereof.

A method of determining a vehicle accident, a server device for performing the method, and a vehicle electronic device and an operation method thereof according to embodiments of the disclosure will be described in detail with reference to the accompanying drawings. In the drawings, the same components are illustrated using the same reference numerals. In addition, throughout the detailed description, the same component is represented by the same name.

FIG. 1 is a diagram for describing communication between a server 100 and a vehicle 150 according to an embodiment of the disclosure.

In an embodiment of the disclosure, the server 100 may determine whether an accident involving the vehicle 150 has occurred by using communication between the server 100 and the vehicle 150.

Referring to FIG. 1, the vehicle 150 may communicate with the server 100 via a wireless communication network.

The vehicle 150 can be equipped to transmit its speed and location, along with a vehicle identifier, such as a VIN, license plate, etc. For example, the vehicle 150 may include a GPS module and a sensor that measures the speed based on engine revolutions per minute, and a transmitter.

In an embodiment of the disclosure, the server 100 receives, from the vehicle 150, first information including a speed and a location of the vehicle 150 during successive variable communication period (operation S151). In addition, the server 100 obtains second information which is environment information regarding a trail of the vehicle 150. Subsequently, the server 100 may update a communication period based on the first information and the second information such that a moving range of the vehicle 150 during the communication period corresponds to a reference value (operation S152). Then, the server 100 may transmit a set communication period to the vehicle 150 (operation S153). Furthermore, the server 100 may determine whether an accident involving the vehicle 150 has occurred, based on whether the server receives the updated first information from the vehicle 150 during the updated communication period. In this case, "updating a communication period" may mean newly setting the communication period each time the updated first information is received. For example, the server 100 may set a value of a communication period based on first information received during a previous communication period and then set a value of a next communication period based on first information received during the set communication period.

In an embodiment of the disclosure, the wireless communication network is a network for supporting long-range communications according to a long-range communication standard, and may support communication between the vehicle 150 and the server 100 located at great distances from each other. In detail, the wireless communication network may be a communication network conforming to $3^{rd}$ generation (3G), $4^{th}$ generation (4G), and/or $5^{th}$ generation (5G) communication standards, or a network for Internet communication. Furthermore, the wireless communication network may be any of various networks supporting long-range communication in addition to the above-described examples.

In an embodiment of the disclosure, the vehicle 150 transmits first information to the server 100 by periodically performing communication with the server 100 at intervals of communication periods set by the server 100 (operation S151). In this case, the first information may include information about a speed and a location of the vehicle 150. In other words, the first information may include information about a speed of the vehicle 150 and information about a location thereof. In detail, the first information may include information about a speed and a current location of the vehicle 150, which correspond to a given communication period.

For example, the information about the speed of the vehicle 150 may be an average speed of the vehicle 150 during the given communication period, a speed of the vehicle 150 at a time point included in the communication period, or an average speed of the vehicle 150 during some time intervals included in the communication period. Furthermore, the information about the location of the vehicle 150 may include GPS information obtained from a vehicle's GPS module (not shown) and location information (e.g., map information corresponding to a current location) obtained from a vehicle's navigation system (not shown).

In addition, the server 100 may obtain second information which is environment information regarding the trail of the vehicle 150. In detail, the server 100 may receive first information from the vehicle 150 and then obtain, based on the first information, second information which is environment information regarding the trail of the vehicle 150. In detail, the server 100 may identify a trail of the vehicle 150 based on location information of the vehicle 150 included in the first information and obtain environment information regarding the trail of the vehicle 150.

In this case, the second information may include information indicating a driving environment for the trail of the vehicle 150. In certain embodiments, the trail of the vehicle can include a collection of locations from the location of the vehicle along a direction of motion of the vehicle. The direction of motion can be determined based on two most recent locations of the vehicle among other ways. In certain embodiments, the trail of the vehicle can be a section of road, or highway at the location of the vehicle.

In detail, the second information may include at least one of weather, where the trail is in the shade, road conditions, information about occurrence of another accident, information whether the trail is in an accident-prone area, or information about driving conditions, which all correspond to the trail of the vehicle 150.

Furthermore, the second information may be obtained by the server 100 accessing a server (not shown) that provides traffic information. For example, the server 100 may receive, from the server that provides traffic information, traffic conditions in the vicinity of the vehicle 150 (based on the location information included in the first information). The traffic conditions can include, for example, but not limited to, information about occurrence of another accident (or an accident not involving the vehicle), weather information, and information about whether the corresponding location is within an accident-prone area. In other words, the server 100 may obtain, based on the location information included in the first information, GPS-based information (e.g., a shaded area, an accident-prone area, information about occurrence of another accident, weather information, etc.).

Furthermore, the server 100 may obtain, based on the location information included in the first information, the second information including topographic information on a map, corresponding to the location information. In addition, by analyzing the topographic information on the map, the server 100 may obtain the second information indicating a driving environment for a corresponding location, such as information about whether the corresponding location is within a steep slope section, a sharp curve section, an accident-prone area, etc.

The server 100 may also store therein map information corresponding to a map or the like. Here, the map information may be a navigation map itself, and include information about road conditions (e.g., a sharp curve section, rockfall section, etc.) on the map and/or road driving regulations (e.g., a speed limit, etc.). When the server 100 stores the map information therein, the server 100 may directly obtain the second information corresponding to the location of the vehicle 150 by matching the location information included in the first information to the map information. On the other hand, when the server 100 does not store the map information therein, the server 100 may obtain the second information corresponding to the location of the vehicle 150 by accessing another server (not shown) or device (not shown) that provides the map information and requesting the second information from the other server or device.

The server 100 may update and set, based on the first information and the second information, a communication period so that a moving range of the vehicle 150 during the communication period corresponds to a reference value (operation S152). For example, the server 100 may set the communication period so that the vehicle 100 will travel a certain distance during the communication period based on the speed in the first information.

It is noted that during an accident, the sensors and modules on the vehicle 100 may be damaged or destroyed. As a result, the vehicle 100 will stop transmitting updated first information.

Figure 2:
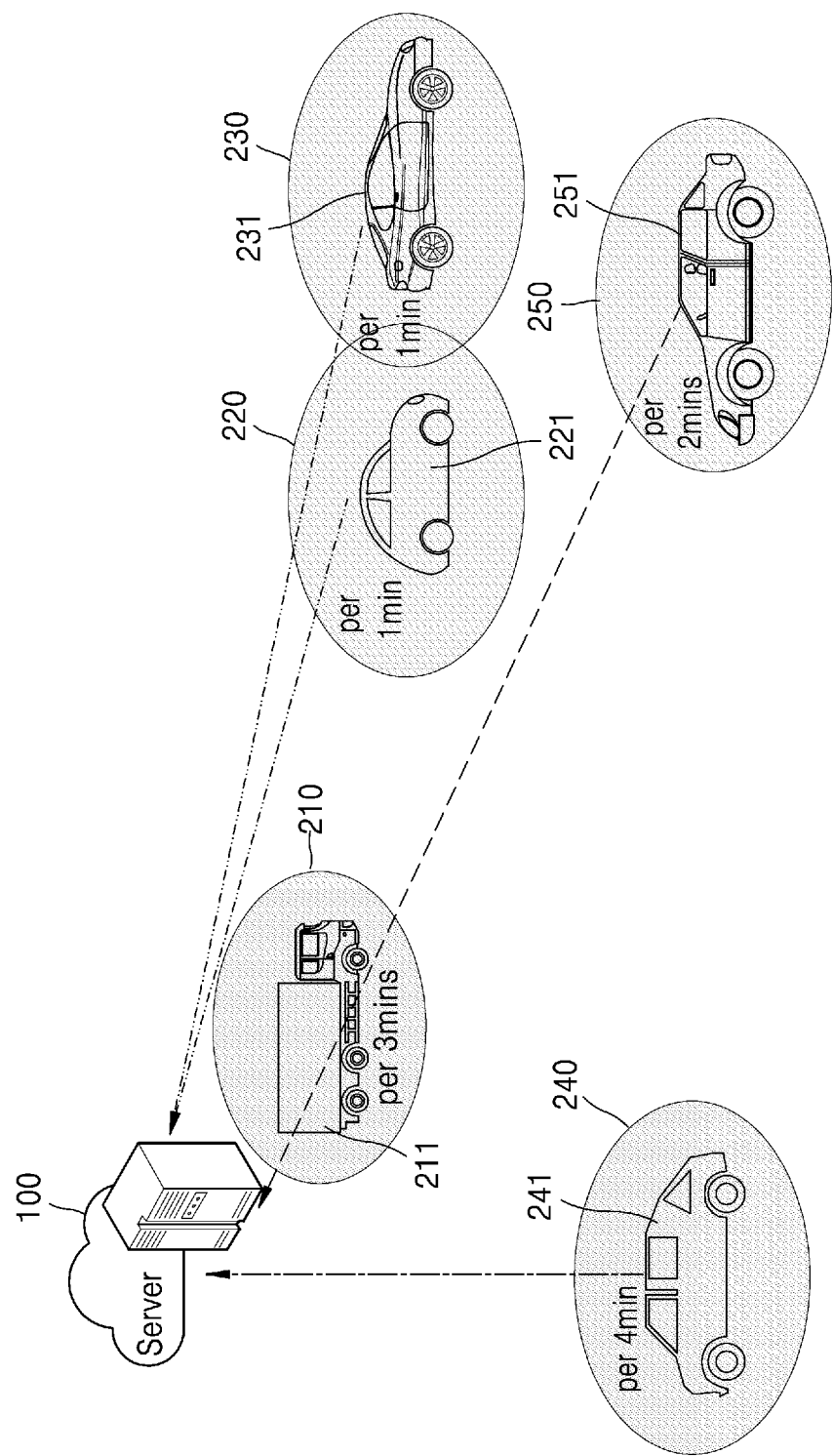
FIG. 2 is a diagram for describing an operation of changing a period of communication between a server and a vehicle, according to an embodiment of the disclosure.

Based on whether the first information, the speed and location, are updated for the updated communication period, the server 100 can determine that the vehicle 150 has been in an accident FIG. 2 is a diagram for describing an operation of changing a period of communication between a server 100 and a vehicle, according to an embodiment of the disclosure. In FIGS. 1 and 2, the same components are illustrated using the same reference numerals. Thus, descriptions already provided above with respect to FIG. 1 will be omitted from the description of components shown in FIG. 2.

In an embodiment of the disclosure, the server 100 may set a communication period for each vehicle.

In other words, the server 100 may individually communicate with each of a plurality of vehicles 211, 221, 231, 241 and 251 and set a communication period corresponding to each of the vehicles 211, 221, 231, 241 and 251.

The server 100 may be a server operated and managed by an organization capable of managing vehicle accidents. Alternatively, the server 100 may be a server of a service provider that provides a service for supporting handling of vehicle accidents. Alternatively, the server 100 may be a server operated and managed by a vehicle manufacturer to support handling of vehicle accidents. In addition, the server 100 may be referred to as a server device, a server system, or the like. For convenience of description, a server, a server device, a server system, etc. will be hereinafter collectively referred to as a 'server'.

The server 100 may register the vehicles 211, 221, 231, 241 and 251 and individually set a communication period for each of the registered vehicles 211, 221, 231, 241 and 251 for transmission.

In an embodiment of the disclosure, the server 100 may set an initial communication period to a value inversely proportional to a speed of a vehicle so that a moving range of the vehicle during the communication period is maintained at a reference value. In addition, the server 100 may set a final communication period by applying a weight value to the initial communication period based on the second information. In this case, the final communication period is a communication period that the server 100 transmits to the vehicle (e.g., 150 in FIG. 1) in operation S153.

When an accident occurs, it may be difficult to search for a vehicle because a moving range of the vehicle is not constant in tracking a location of the vehicle. Accordingly, the communication period of the vehicle may be flexibly set by maintaining the moving range during the communication period to be at a value corresponding to the reference value. For example, the communication period may be set to be inversely proportional to the speed of the vehicle. Furthermore, by setting the communication period of the vehicle based on the second information including information about a driving environment for the vehicle on its trail, an interval of communication between the vehicle and the server 100 may be flexibly adjusted based on a probability or risk of occurrence of a vehicle accident.

In detail, when a location or point corresponding to the vehicle's trail has a high probability and/or risk of occurrence of an accident based on the second information, the server 100 may set a final communication period by applying a high weight value to an initial communication period. In addition, when the location or point corresponding to the vehicle's trail has a lower probability and/or risk of occurrence of an accident based on the second information, the server 100 may set a final communication period by applying a lower weight value to the initial communication period.

In detail, the probability or risk of occurrence of an accident involving the vehicle varies depending on a driving environment on the vehicle's trail. For example, when melted snow refreezes to form black ice that is a thin layer of ice on roads in a vehicle's trail in winter, the probability of occurrence of an accident involving the vehicle is very high. When a driving environment on the vehicle's trail is a black ice-prone section, a final communication period may be calculated by applying a highest weight value from a range of weight values to the initial communication period. For convenience of description, a final communication period will be hereinafter referred to as a 'communication period'.

For example, when a weight value is set to be proportional to a probability or risk of occurrence of an accident, a final communication period may have a value inversely proportional to the set weight value. When a vehicle is moving in a driving environment with a high probability of occurrence of an accident, a communication period for communication between the server 100 and the vehicle may be set to be short so that the server 100 may more frequently check whether the accident has occurred.

As another example, when a weight value is set to be inversely proportional to a probability or risk of occurrence of an accident, a final communication period may have a value proportional to the set weight value.

In an embodiment of the disclosure, as the probability and/or risk of occurrence of an accident involving a vehicle becomes higher based on the second information, a communication period for communication between the server 100 and the vehicle may be set to be shorter so that the server 100 may more frequently check whether the accident has occurred.

FIG. 2 shows vehicles moving in different driving environments.

The vehicles 211, 221, 231, 241, and 251 that are respectively moving in illustrated different spaces, 210, 220, 230, 240, and 250, may communicate with the server 100 over different communication periods.

Furthermore, the server 100 may register the vehicles 211, 221, 231, 241, and 251 to individually manage pieces of the first information respectively received from the vehicles 211, 221, 231, 241, and 251.

For example, before setting a communication period, the server 100 may receive identification information of the vehicle (e.g., 211) from the vehicle. Then, the server 100 may register the vehicle 211 based on the received identification information, and when the first information is received from the registered vehicle 211, the server 100 may set a communication period corresponding to the first information and transmit the communication period to the registered vehicle 211.

In this case, the identification information of the vehicle 211 is unique information of the vehicle 211 used to identify the vehicle 211 from among a plurality of vehicles, such as a vehicle identification number (VIN), a license plate number of the vehicle 211, etc.

Alternatively, the server 100 may receive an identification number of the vehicle 211, together with the first information. In detail, the vehicle 211 may transmit the first information and the identification number of the vehicle 211 together to the server 100. In other words, each time the vehicle 211 transmits the first information, the vehicle 211 may transmit the identification number of the vehicle 211 together therewith to the server 100.

It is noted that the communication period may need to be shorter when the speed of the vehicle 211, 221, 231,241, and 251 is higher, because the higher. speed can result in a higher probability of accident However, a given speed on a highway or a rural area is not accident prone as a similar speed in a crowded area with many intersections. Accordingly, the location of the vehicle is also a factor in determining the communication period. Additionally, weather, such as rain, ice or snow can also be a factor. Road conditions such as highway repair, recency of paving or road maintenance, whether the location is in the shade or sun glare, and empirical data indicating a high number of accidents in the past in the location can also be factors in determining the communication period. In certain embodiments, the communication period is set to be shorter when the speed, location, and environment information suggest a higher probability of an accident occurring. For example, the server 100 may set a communication period to 3 minutes based on the first information and the second information corresponding to the vehicle 211 moving in a first space 210. Furthermore, the server 100 may set a communication period to 1 minute based on the first information and the second information corresponding to the vehicle 221 moving in a second space 220 having a higher probability of occurrence of an accident than the first space 210.

As described above, in an embodiment of the disclosure, a communication period for communication between the server 100 and a vehicle may be flexibly set based on a speed and a location of the vehicle and environment information regarding a vehicle's trail.

Figure 3:
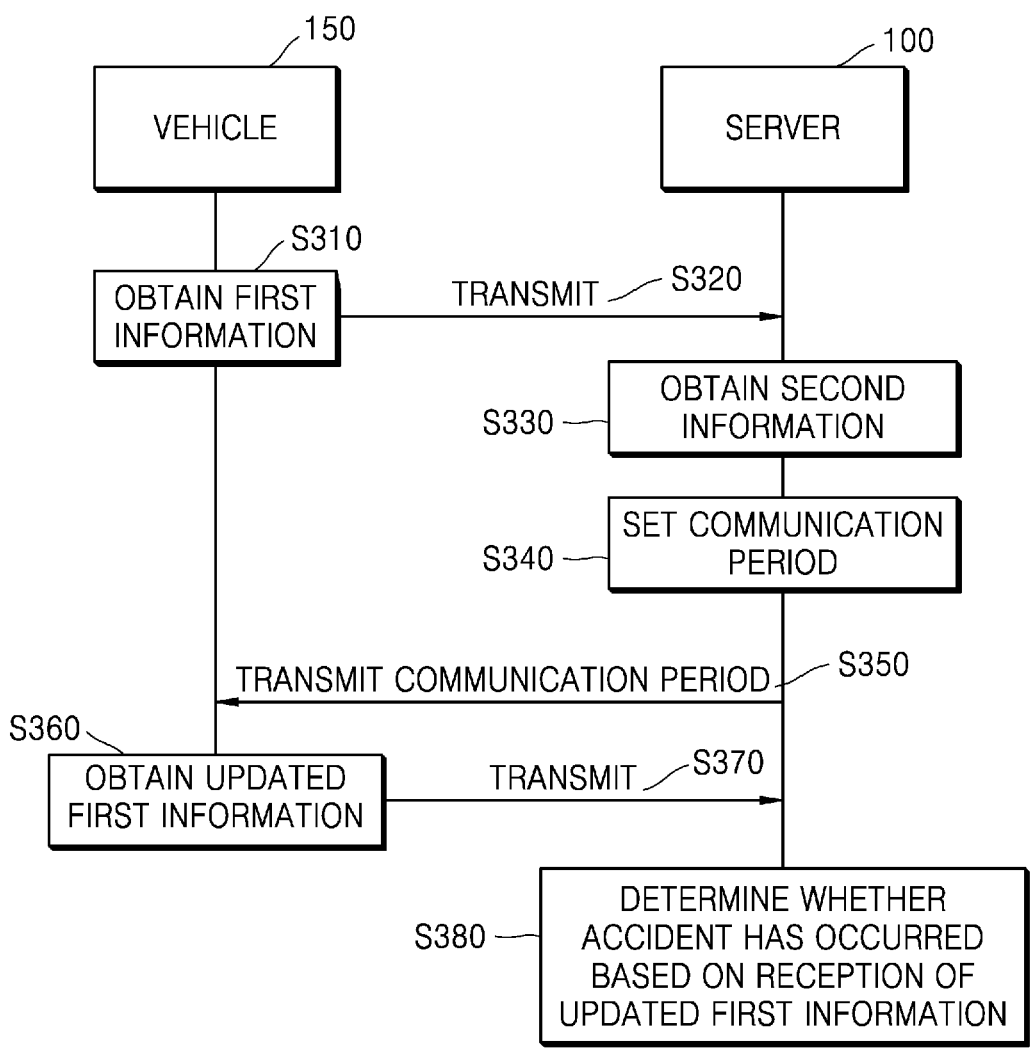
FIG. 3 is a diagram for describing a method of determining a vehicle accident, according to an embodiment of the disclosure.

FIG. 3 is a diagram for describing a method of determining a vehicle accident, according to an embodiment of the disclosure. Generally, the vehicle 150 transmits first information that includes the speed and location of the vehicle to the server 100. The server 100 then obtains second information about the environment of the trail of the vehicle. In certain embodiments, the server 100 can use the location of the vehicle 150 to determine the second information. In other embodiments, the vehicle can provide the second information. Based on the first information and the second information, the server 100 sets the communication period based on the first information and the second information and transmits the communication period to the vehicle. At the completion of the communication period, the vehicle 150 obtains updated first information—speed and location—and transmits to server 100. The server 100 determines whether an accident has occurred based on reception of the updated first information and can transmit an alert to emergency services.

In FIGS. 1 through 3, the same components are illustrated using the same reference numerals. Thus, descriptions already provided above with respect to FIGS. 1 and 2 will be omitted from the description of components shown in FIG. 3. Furthermore, operations S320, S340, and S350 in FIG. 3 may respectively correspond to operations S151, S152, and S153 in FIG. 1.

Referring to FIG. 3, a vehicle 150 may be a vehicle that is moving along a given trail. The vehicle 150 may obtain first information. In detail, the vehicle 150 may obtain first information that is information about its location and speed corresponding to a current time point. Alternatively, the vehicle 150 may obtain, as the first information, information about its location and speed corresponding to a given communication period.

The vehicle 150 may transmit the first information to the server 100 (operation S320). In detail, the vehicle 150 may transmit the first information to the server 100 via a wireless communication network (operation S320). Furthermore, the vehicle 150 may transmit, together with the first information, its own identification number (e.g., a VIN or the like) to the server 100. In addition, the first information may be transmitted from the vehicle 150 to the server 100 for every set communication period.

The server 100 may obtain second information that is environment information regarding a trail of the vehicle 150 (operation S330). In detail, the second information may be obtained based on the first information. For example, the server 100 may determine the trail of the vehicle based on location information included in the first information, server-based GPS-based information such as shadow conditions, accident-propensity, whether an accident involving other vehicles has occurred, weather information, etc.

The server 100 may update and set a communication period based on the first information and the second information such that a moving range of the vehicle 150 during the communication period corresponds to a reference value (operation S340). In detail, each time the first information is received during a communication period, the server 100 may reset the communication period based on the received first information and the second information. For example, the communication period can correspond to a particular distance. That is, the communication period can be the amount of time that the vehicle at the speed of the first information travels the particular distance.

An operation of setting a communication period will now be described in detail with reference to FIG. 4. The communication period is set based on the first information so that the vehicle will move approximately 1 km.

Figure 4:
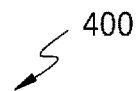
FIG. 4 is a diagram for describing a flexibly changing period of communication between a server and a vehicle, according to an embodiment of the disclosure.

FIG. 4 is a diagram for describing a flexibly changing period of communication between the server 100 and the vehicle 150, according to an embodiment of the disclosure.

Referring to FIG. 4, the server 100 may set a communication period so that a moving range of the vehicle 150 during the communication period is maintained at a value corresponding to a reference value. For example, when the first information indicates a speed, the column corresponding to the speed can be examined, and the entry in the second row can be selected. For example, if the speed is 80 km/h, the communication period can be 45 seconds.

The reference value may be experimentally optimized and set by the server 100.

When the updated first information is not received by the server 100 even after a lapse of the set communication period, the server 100 may determine that an accident involving the vehicle 150 has occurred and proceed with an accident handling procedure. To handle the accident, first, it is necessary to search for the vehicle 150 involved in the accident by determining in detail a location of the vehicle 150 suspected of having been involved in the accident. In this case, when a search range for the vehicle 150 or a range of an expected location of the vehicle 150 is not constant, searching for the vehicle 150 may be difficult. Thus, in an embodiment of the disclosure, a communication period for communication between the vehicle 150 and the server 100 may be set so that a moving range of the vehicle 150 during the set communication period is maintained constant.

FIG. 4 shows a speed of the vehicle 150 and a corresponding communication period when the reference value is set to 1 km. In detail, table 400 shows a communication period corresponding to a speed of the vehicle 150, which is set so that a moving range of the vehicle 150 becomes 1 km when the vehicle 150 moves at a speed during a corresponding communication period.

For example, when the speed of the vehicle 150 included in the first information is 150 km/h, the communication period may be set to 24 seconds. In this case, a distance travelled by the vehicle 150 for the communication period of 24 seconds may be approximately 1 km. Furthermore, when the speed of the vehicle 150 included in the first information is 120 km/h, the communication period may be set to 30 seconds. In this case, a distance travelled by the vehicle 150 for the communication period of 30 seconds may be approximately 1 km. In addition, when the speed of the vehicle 150 included in the first information is 100 km/h, the communication period may be set to 36 seconds. In this case, a distance travelled by the vehicle 150 for the communication period of 36 seconds may be approximately 1 km. In other words, when a circle is drawn based on GPS information (specifically, a center of the circle) included in the first information obtained during the last communication, a radius of the circle will be approximately 1 km, and the vehicle 150 will be in the circle. Accordingly, when it is determined that an accident involving the vehicle has occurred, the above range of the circle may be used as a search range for the vehicle 150.

As shown in the table 400 of FIG. 4, a communication period may be set to a value inversely proportional to a speed of the vehicle 150, and the communication period may be set to a value which increases when the speed of the vehicle 150 decreases.

Referring back to FIG. 3, the server 100 may transmit a value of a set communication period to the vehicle 150 (operation S350).

The vehicle 150 may then receive the value of communication period and obtain updated first information during the received communication period (operation S360). In detail, the vehicle 150 may newly obtain the first information during the received communication period.

Thereafter, the vehicle 150 may transmit, to the server 100, the first information newly obtained in operation S360 as the updated first information (operation S370). Accordingly, the server 100 may receive the updated first information within the set communication period.

The server 100 may determine whether an accident has occurred, based on reception of the updated first information (operation S380). In detail, when the server 100 does not receive the updated first information within the communication period set in step S340, the server 100 may determine that the accident involving the vehicle 150 has occurred.

On the other hand, when the server 100 receives the updated first information within the communication period set in operation S340, the server 100 may determine that the accident involving the vehicle 150 has not occurred and newly set a communication period based on the updated first information. In other words, when the server 100 receives the updated first information within the communication period set in operation S340, the server 100 returns to the operation (S340) of setting a communication period and reset a communication period based on the updated first information.

Figure 5:
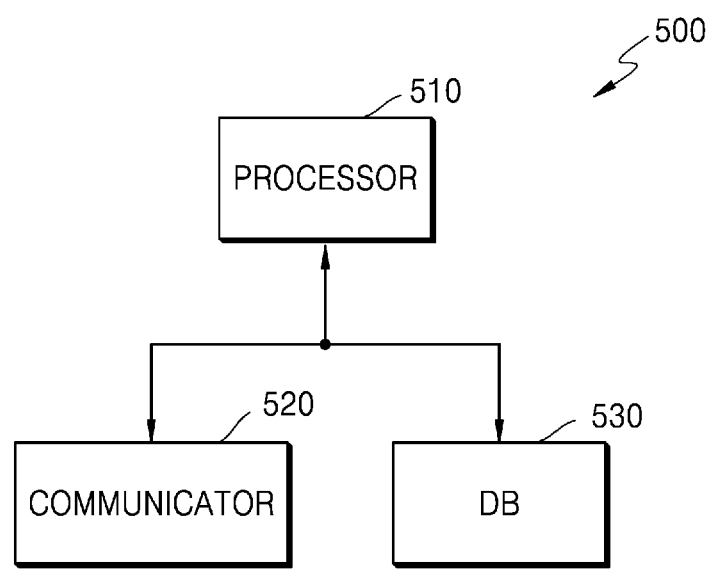
FIG. 5 is a block diagram of a configuration of a server device according to an embodiment of the disclosure.

FIG. 5 is a block diagram of a configuration of a server 500 according to an embodiment of the disclosure. The server 500 illustrated in FIG. 5 may correspond to the server 100 described with reference to FIGS. 1 through 4. Thus, descriptions already provided above with respect to FIGS. 1 through 4 will be omitted from the description of the configuration and operations of the server 500.

Referring to FIG. 5, the server 500 may include a communicator 520 and a processor 510. The server 500 may further include a database (DB) 530.

In an embodiment of the disclosure, the communicator 520 may communicate with the vehicle (150 of FIG. 3). In detail, the communicator 520 may transmit or receive, according to control by the processor 510, data and/or signals to or from the vehicle 150 via the wireless communication network described with reference to FIG. 1.

The processor 510 may control an intended operation to be performed by executing at least one instruction. In an embodiment of the disclosure, the processor 510 may update, based on first information and second information, a communication period so that a moving range of the vehicle 150 during the communication period corresponds to a reference value, wherein the first information is received from the vehicle 150 via the communicator 520 during every variable communication period and includes a speed and a location of the vehicle 150, and the second information is environment information regarding a trail of the vehicle 150. In addition, the processor 510 may control the communicator 520 so that the updated communication period is transmitted to the vehicle 150. Furthermore, the processor 510 may determine whether an accident involving the vehicle 150 has occurred based on whether the updated first information is received from the vehicle 150 during each updated communication period.

In addition, when it is determined that the accident has occurred, the processor 510 may proceed with an accident handling procedure. In detail, when it is determined that the accident has occurred, the processor 510 may perform a procedure for providing relief to a driver involved in the accident and a handling process for the vehicle 150 involved.

In detail, when it is determined that the accident has occurred, the processor 510 may transmit information notifying a vehicle accident rescue organization about the occurrence of the accident.

For example, when it is determined that the accident has occurred, the processor 510 identify a location of the vehicle 150 where the accident is predicted to have occurred based on the previously received first information and transmit the identified location of the vehicle to the vehicle accident rescue organization. In this case, the predicted location of the vehicle 150 may mean a search range for the vehicle 150 described above with reference to FIG. 4 (e.g., a circle centered on a point which is identified based on GPS information included in the first information obtained during the last communication). In addition, the vehicle accident rescue organization may be a firefighting disaster response center (e.g., a fire station, a 119 report center, etc.) a hospital or an institution associated with disaster rescue, etc.

The DB 530 may include a memory (not shown) and store, in the memory, at least one of at least one instruction, a program, or data necessary for the server 500 to perform a predefined operation. Furthermore, the DB 530 may store reference values for each speed used for setting a communication period.

In addition, the DB 530 may store at least one of the first information or the second information. In detail, when the first information is received from the vehicle 150, the processor 510 may control the DB 530 to store the received first information.

Furthermore, the DB 530 may store map information therein. For example, when obtaining the second information based on location information of the vehicle 150, which is included in the first information, the processor 510 may obtain information about a driving environment corresponding to the location information by matching the location information to the map information stored in the DB 530. Here, the map information may be a navigation map itself, and include information about road conditions (e.g., a sharp curve section, rockfall section, etc.) on a trail, information about road driving regulations (e.g., a speed limit, etc.), etc.

Furthermore, the DB 530 may store data necessary for the server 500 to perform a computation via a neural network. In this case, the neural network may be a neural network that receives the first information and second information and calculates and outputs an optimal communication period.

Specifically, the neural network may be formed as a deep neural network (DNN) based on deep learning using artificial intelligence (AI) technology. Here, 'DNN' is an artificial neural network model that simulates nerves in the brain. Furthermore, 'parameters' used to form a DNN are values used for computation in each layer constituting the neural network, and may include, for example, weights used when input values are applied to a mathematical equation performed in the DNN. Also, the parameters may be represented in a matrix form. Parameters of a DNN are values set as a result of training and may be updated using separate training data as needed.

In detail, the server 500 may perform computation via a neural network to calculate an optimal communication period based on the first information and the second information. In addition, after the communication period is calculated, the neural network may adjust its parameter values based on recognition accuracy of occurrence of an accident when the calculated communication period is applied. In detail, the neural network may be trained in a direction in which the recognition accuracy of occurrence of an accident is increased, and accordingly, receive the first information and the second information to output an optimal communication period.

The processor 510 controls all operations of the server 500. For example, the processor 510 may control all operations of the DB 530 and the communicator 520 by executing at least one of at least one instruction or a program stored in the DB 530 of the server 500 or an internal memory (not shown) of the processor 510.

Furthermore, the processor 510 may store therein at least one instruction and/or a program for controlling operations of the server 500. In addition, the processor 510 may control all operations of the DB 530 and the communicator 520 by executing the at least one instruction and/or program included therein.

The communicator 520 may include one or more components that enable communication with the vehicle 150. In detail, the communicator 520 may include at least one communication module for performing communication with another device (e.g., a vehicle and/or an external server) located at a distance via the Internet or a communication network conforming to communication standards such as 3G, 4G, and/or 5G standards.

Furthermore, the communicator 520 may include a tuner for performing broadcast reception and a communication module capable of performing data transmission and reception via a network that conforms to communication standards such as Bluetooth, wireless local area network (WLAN) (or Wi-Fi), wireless broadband (Wibro), World Interoperability for Microwave Access (Wimax), code division multiple access (CDMA), wide-band CDMA (WCDMA), etc.

In addition, the communicator 520 may further include a communication module for realizing a Long Range (LoRa) communication technology. In this case, LoRa is a medium- and long-range wireless communication technology to enable long-range communications with low power consumption.

In an embodiment of the disclosure, the communicator 520 may communicate with the vehicle 150 via at least one communication module supporting long-range communication, such as a communication module conforming to a communication standard such as 3G, 4G, and/or 5G standards, a communication module for realizing a LoRa communication technology, etc.

FIG. 6 is a flowchart of a method of determining a vehicle accident, according to an embodiment of the disclosure. FIG. 6 is a flowchart illustrating operations performed by a server, according to an embodiment of the disclosure. In detail, FIG. 6 is a flowchart illustrating operations performed by the server 100 or 500 to determine whether a vehicle accident has occurred, according to an embodiment of the disclosure. In FIG. 6, the same components and operations as in FIG. 3 are illustrated using the same reference numerals, and thus descriptions that are already provided above with respect to FIG. 3 are omitted. In addition, the operations illustrated in FIG. 6 are described with reference to the operations of the server 500 of FIG. 5. Furthermore, a vehicle referred to in a vehicle accident determination method 600 of FIG. 6 corresponds to the vehicle 150 shown in FIG. 3.

Referring to FIG. 6, in the vehicle accident determination method 600, first information including a speed and a location of the vehicle 150 is received from the vehicle 150 during each variable communication period (operation S320). Operation S320 may be performed by the communicator 520 receiving the first information according to control by the processor 510 of the server 500.

Then, according to the vehicle accident determination method 600, second information that is environment information regarding a trail of the vehicle 150 may be obtained (operation S330). In this case, operation S330 may be performed by the processor 510. For example, operation S330 may be performed by requesting and receiving the second information from an external server or the like according to control by the processor 510.

Thereafter, according to the vehicle accident determination method 600, a communication period may be updated based on the first information and the second information such that a moving range of the vehicle 150 during the communication period corresponds to a reference value (operation S340). In this case, operation S340 may be performed by the processor 510. In detail, operation S340 may be performed by the processor 510 performing computation via a neural network to calculate the communication period.

Operation S340 may further include an operation (not shown) of transmitting the updated communication period to the vehicle 150. In detail, the processor 510 may control the communicator 520 to transmit the updated communication period to the vehicle 150.

Subsequently, according to the vehicle accident determination method 600, it is determined whether an accident involving the vehicle 150 has occurred, based on whether the updated first information is received from the vehicle 150 during the updated communication period (operation S380). In this case, operation S380 may be performed by the processor 510. Operation S380 is now described in more detail with reference to FIG. 7A.

Figure 7A:
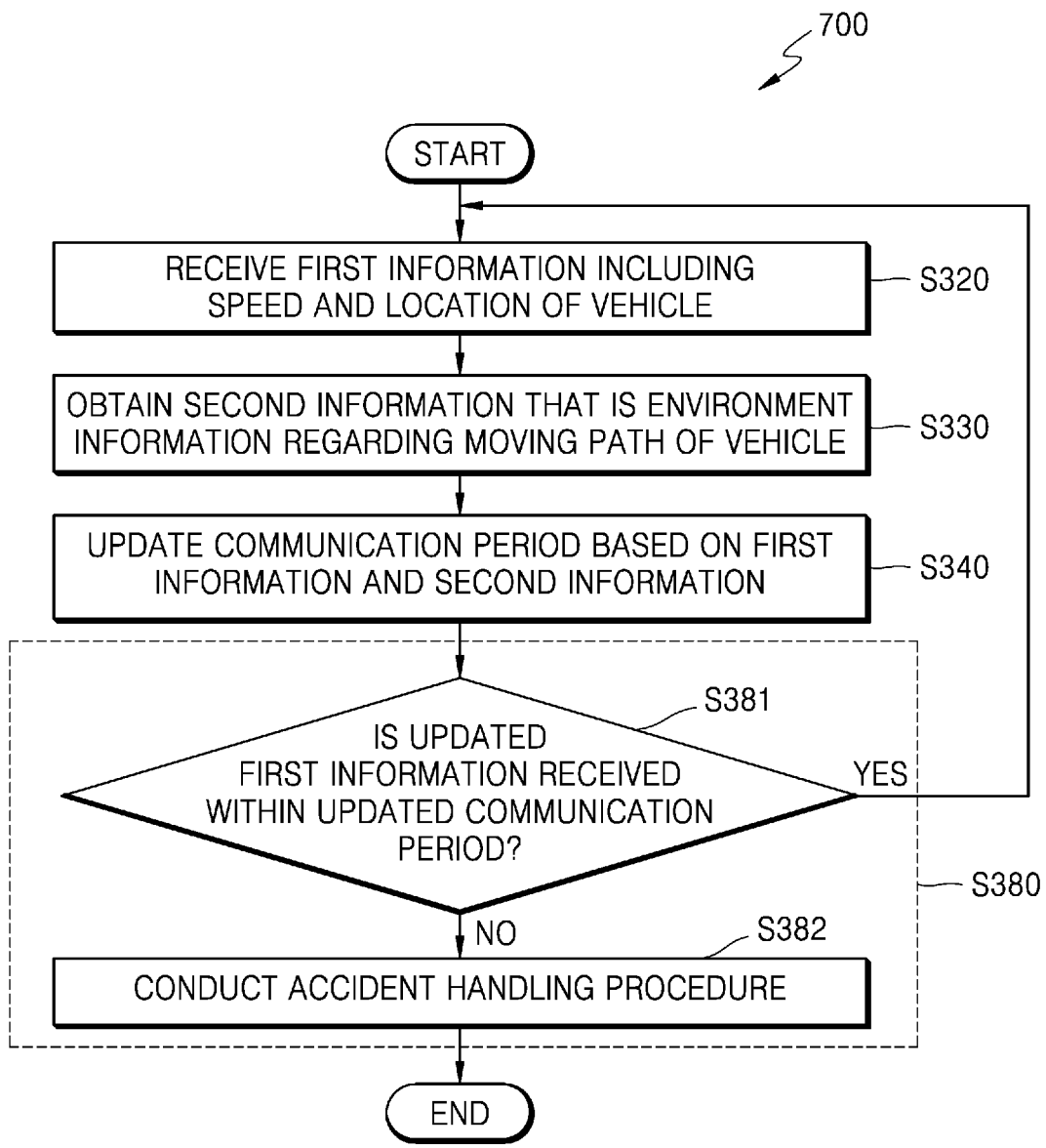
FIG. 7A is a detailed flowchart of the method of determining a vehicle accident, according to the embodiment of the disclosure illustrated in FIG. 6.

FIG. 7A is a detailed flowchart of the vehicle accident determination method according to the embodiment of the disclosure illustrated in FIG. 6. In FIG. 7A, the same components and operations as in FIG. 6 are illustrated using the same reference numerals, and thus descriptions that are already provided above with respect to FIG. 6 are omitted.

Referring to FIG. 7A, operation S380 may include operations S381 and S382.

Referring to FIG. 7A, in a vehicle accident determination method 700, it is determined whether the updated first information is received during the updated communication period (operation S381). In this case, operation S381 may be performed by the processor 510.

Then, in the vehicle accident determination method 700, when the updated first information is not received from the vehicle 150 within the updated communication period as a result of the determination in operation S381, it is determined that an accident involving the vehicle 150 has occurred, and an accident handling procedure may proceed (operation S382). Here, operation S382 may be performed by the processor 510.

On the other hand, according to the vehicle accident determination method 700, when the updated first information is received from the vehicle 150 within the updated communication period as a result of the determination in operation S381, an operation of setting the communication period based on the updated first information and transmitting the communication period may be performed again.

Figure 7B:
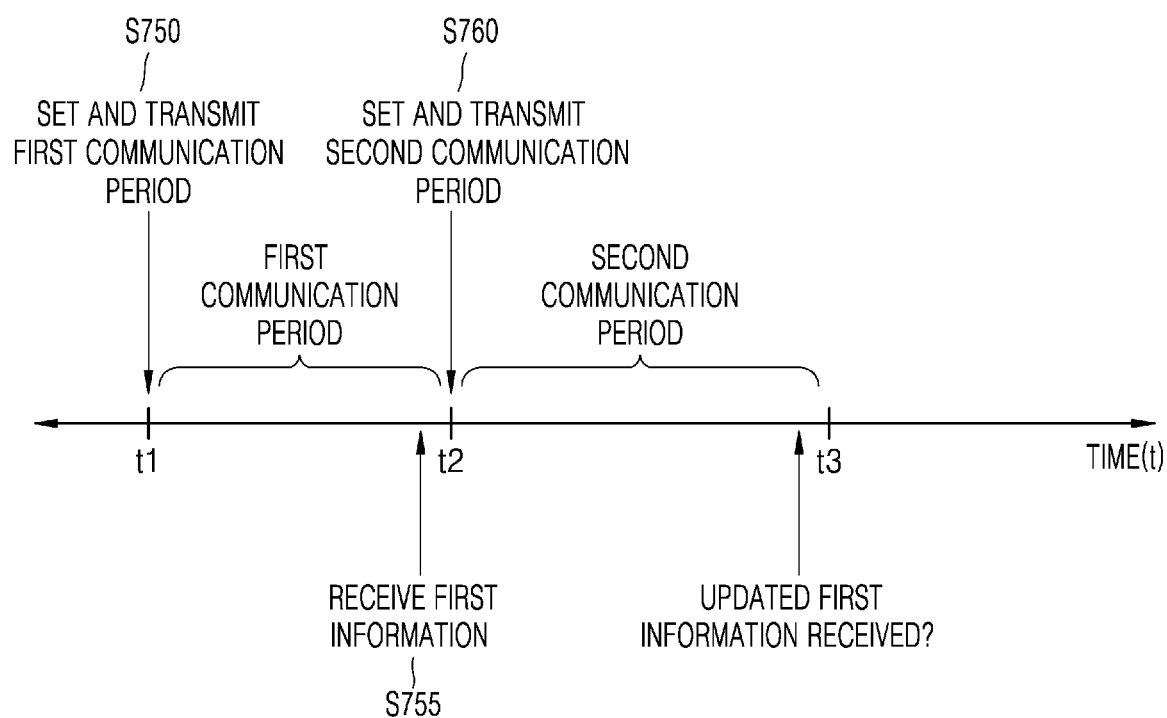
FIG. 7B is a diagram for describing an operation S380 of FIG. 7A of determining whether an accident has occurred.

FIG. 7B is a diagram for describing operation S380 of FIG. 7A.

Referring to FIG. 7B, the processor 510 may set a communication period to a first value based on first information received before time point t1 or at a time point close to the time point t1 and transmit the set communication period to the vehicle 150 (operation S750). A communication period having a first value is hereinafter referred to as a 'first communication period'. The first communication period may be a time interval between time points t1 and t2.

The vehicle 150 may receive the first communication period and transmit first information that is newly obtained within the first communication period to the server 500 such that the server 100 may receive the first information before the end of the first communication period. Accordingly, the server 500 may receive the first information at a time point corresponding to time point t2 (operation S755). In this case, the time point corresponding to the time point t2 may be the time point t2 itself or a time point which is within a preset offset interval before and after the time point t2 and is adjacent to the time point t2

Then, the processor 510 of the server 500 may set the communication period to a second value based on the first information received before time point t2 or at a time point close to the time point t2 and transmit the set communication period to the vehicle 150 (operation S760). A communication period having a second value is hereinafter referred to as a 'second communication period'. The second communication period may be a time interval between time points t2 and t3.

Furthermore, the server 500 may determine whether new first information (or updated first information) is received within the second communication period and determine, based on a result of the determination, whether an accident involving the vehicle 150 has occurred.

When the vehicle 150 is travelling normally, the vehicle 150 may transmit the new first information to the server 500 to maintain communication with the server 500. However, when a problem occurs due to the accident involving the vehicle 150, the vehicle 150 is unable to transmit the new first information to the server 500 because the requisite modules for transmitting the first information may have been damaged. Thus, the server 500 may determine whether an accident involving the vehicle 150 has occurred based on whether the first information is received within the set communication period.

Figure 8:
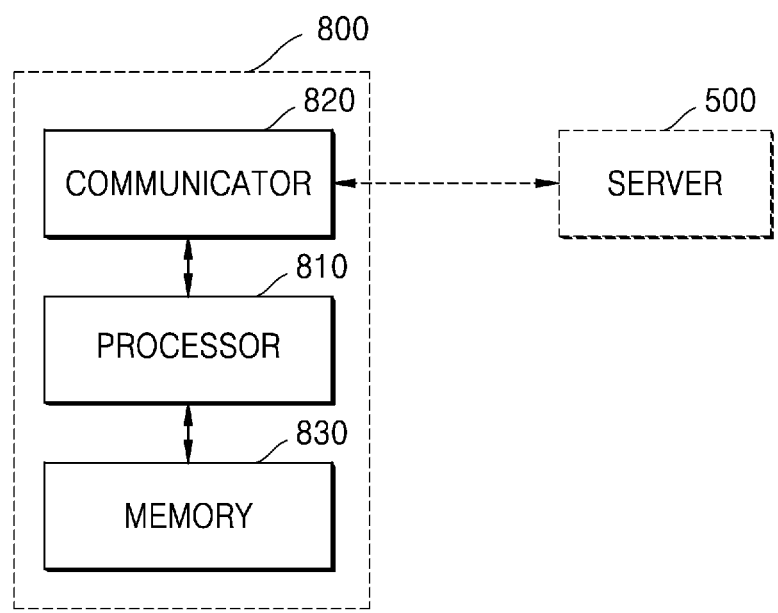
FIG. 8 is a block diagram of a configuration of a vehicle electronic device according to an embodiment of the disclosure.

FIG. 8 is a block diagram of a configuration of a vehicle electronic device 800 according to an embodiment of the disclosure. The vehicle electronic device 800 of FIG. 8 may perform operations of the vehicle 150 described with reference to FIGS. 1 through 7B. In detail, the vehicle electronic device 800 may be an apparatus for performing a method of determining a vehicle accident according to an embodiment of the disclosure.

In an embodiment of the disclosure, the vehicle electronic device 800 refers to a device that performs operations for determining a vehicle accident, and may be included in or mounted to a vehicle.

In detail, in an embodiment of the disclosure, the vehicle electronic device 800 refers to a device for performing operations of determining whether an accident involving a vehicle has occurred and transmitting an alert to notify the outside about the occurrence of the accident such that that an accident handling procedure may proceed, and the vehicle electronic device 800 may be included in or mounted to the vehicle.

Referring to FIG. 8, the vehicle electronic device 800 includes a processor 810 and a communicator 820. The vehicle electronic device 800 may further include a memory 830.

The communicator 820 communicates with the server 500. In detail, the communicator 820 may communicate with the server 500 via the wireless communication network described with reference to FIG. 1.

The processor 810 includes a processor for executing at least one instruction, and controls the communicator 820 to transmit, to the server 500, first information including a speed and a location of a vehicle (not shown) and receive, from the server 500, a value of a communication period set based on the first information and second information that is environment information regarding a trail of the vehicle. Furthermore, when the communication period arrives, the processor 810 may control the communicator 820 to transmit first information corresponding to a current time point to the server 500. Furthermore, the communication period is a value set so that a moving range of the vehicle during the communication period corresponds to a reference value.

Furthermore, the processor 810 may control all operations of the vehicle electronic device 800. In addition, the processor 810 may operate in conjunction with components included in the vehicle.

The processor 810 may obtain information about a location of the vehicle based on GPS information of the vehicle where the vehicle electronic device 800 is located. Furthermore, the processor 810 may receive speed information of the vehicle where the vehicle electronic device 800 is located and obtain first information including the received speed information. For example, the vehicle may include a sensor for measuring its speed and display the speed measured by the sensor on a speedometer gauge therein. Then, the processor 810 may receive speed information obtained by the vehicle from a sensor included in the vehicle or a component for controlling the speedometer gauge.

As another example, the vehicle electronic device 800 may include a sensor (not shown) for measuring the speed of the vehicle. Furthermore, the speed of the vehicle may be obtained based on a result of detection by the sensor.

In addition, the processor 810 may transmit the first information and identification information of the vehicle to the server 500. For example, the processor 810 may control the communicator 820 to transmit, to the server 500, identification information of the vehicle together with the first information. In this case, the identification information of the vehicle may be repeatedly transmitted to the server 500 for every communication period of the vehicle.

Alternatively, the processor 810 may transmit the identification information of the vehicle to the server 500, separately from the first information, and perform registration between the server 500 and the vehicle electronic device 800.

Furthermore, the processor 810 may execute at least one of one or more instructions stored therein to perform an operation. Alternatively, the processor 810 may execute at least one of one or more instructions stored in the memory 830 to perform an operation. Furthermore, the processor 810 may be configured as a main CPU.

Specifically, the processor 810 may include an internal memory (not shown) and at least one processor (not shown) for executing at least one stored program. In this case, the internal memory of the processor 810 may store one or more instructions. Furthermore, the processor 810 may execute at least one of the one or more instructions stored in the internal memory to perform an operation.

In detail, the processor 810 may include random access memory (RAM) (not shown) that stores signals or data input from outside or is used as a storage area corresponding to various operations performed by the vehicle electronic device 800, read-only memory (ROM) (not shown) storing a plurality of instructions and/or a control program for controlling the vehicle electronic device 800, and at least one processor (not shown).

The processor 810 may further include a graphics processing unit (GPU) (not shown) for processing graphics corresponding to video. Alternatively, the processor 810 may be implemented as a system on chip (SOC) in which a core (not shown) is integrated with the GPU. Alternatively, the processor 810 may include more than a single core, i.e., multiple cores. For example, the processor 810 may include a dual-core (2 cores), triple-core (3 cores), quad-core (4 cores), hexa-core (6 cores), octa-core (8 cores), deca-core (10 cores), dodeca-core (12 cores), hexadeca-core (16 cores), etc.

In addition, the processor 810 may include components for implementing a hardware platform (e.g., an application processor (AP), a memory, etc.) and components for implementing a software platform (an operating system (OS) program, automotive safety software, an application, etc.).

The communicator 820 may communicate with the server 500 via a wireless communication network. Specifically, the communicator 820 may further include a long-range communication module (not shown) for performing communication with a server (not shown) for supporting a long-range communication according to a long-range communication standard. In detail, the communicator 820 may include a long-range communication module (not shown) that performs communication via a communication network conforming to 3G, 4G, and/or 5G communication standards or a network for Internet communication. A long-range communication module (not shown) may also be referred to as a 'long-distance communicator (not shown)'. Although a communication module conforming to 3G, 4G, and/or 5G communication standards has been described as an example of the long-range communication module included in the communicator 820, embodiments of the disclosure are not limited thereto, and the long-range communication module may also include a communication module conforming to a next-generation communication standard such as 6G, 7G, etc.

In addition, the communicator 820 may further include a communication module for realizing a LoRa communication technology. In this case, LoRa is a medium- and long-range wireless communication technology for providing a wireless communication network formed to enable long-range communications with low power consumption.

Furthermore, the communicator 820 may perform short-range communication connection to communicate with an adjacent vehicle or electronic device according to a short-range communication standard. In detail, the communicator 820 may include at least one short-range communication module (not shown) that performs communication according to a communication standard such as Bluetooth, Wi-Fi, Bluetooth Low Energy (BLE), near-field communication (NFC)/radio frequency identification (RFID), Wi-Fi Direct, ultra-wideband (UWB), or ZIGBEE. A short-range communication module (not shown) may be also referred to as a 'short-distance communicator (not shown)'.

The memory 830 may store at least one of data, a program, at least one instruction, or an application.

In detail, the memory 830 may store at least one instruction executed by the processor 810. Furthermore, the memory 830 may store at least one program executed by the processor 810. Then, the processor 810 may control operations according to an embodiment of the disclosure to be performed by executing at least one of the at least one instruction stored in the memory 830.

Furthermore, although FIG. 8 shows that the memory 830 is a block separate from the processor 810, the memory 830 may be included in the processor 810.

In an embodiment of the disclosure, the memory 830 may store first authentication information. The memory 830 may include at least one type of storage medium, i.e., at least one of a flash memory-type memory, a hard disk-type memory, a multimedia card micro-type memory, a card-type memory (e.g., an SD card or an XD memory), RAM, static RAM (SRAM), ROM, electrically erasable programmable ROM (EEPROM), PROM, a magnetic memory, a magnetic disc, or an optical disc.

Hereinafter, operations performed by the vehicle electronic device 800 will be described in more detail with reference to FIG. 9.

Figure 9:
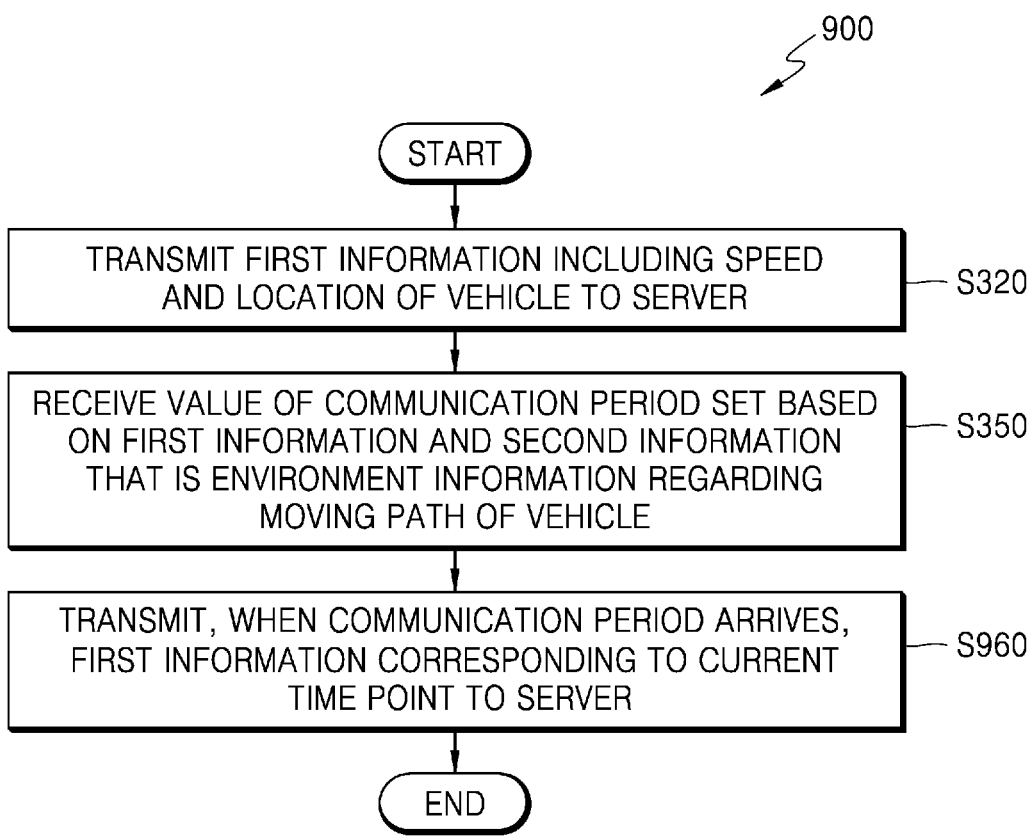
FIG. 9 is a flowchart of an operation method of a vehicle electronic device, according to an embodiment of the disclosure.

FIG. 9 is a flowchart of an operation method of a vehicle electronic device, according to an embodiment of the disclosure. Furthermore, FIG. 9 is a flowchart illustrating operations performed by the vehicle electronic device 800, according to an embodiment of the disclosure. An operation method 900 of the vehicle electronic device 800 according to an embodiment of the disclosure is an operation method of the vehicle electronic device 800 for determining the occurrence of a vehicle accident described with reference to FIGS. 1 through 8. Thus, descriptions of operations for determining occurrence of a vehicle accident, which are already provided above with respect to FIGS. 1 through 8, will be omitted from the description of the operation method 900 illustrated in FIG. 9.

In the operation method 900 of FIG. 9, the same components and operations as in FIGS. 1 through 8 are illustrated using the same reference numerals.

Referring to FIG. 9, in the operation method 900 of the vehicle electronic device 800, first information including a speed and a location of a vehicle is transmitted to the server 500 (operation S320). Operation S320 may be performed by the communicator 820 according to control by the processor 810.

Thereafter, in the operation method 900, a value of a communication period is received, the communication period being set based on the first information and second information that is environment information regarding a trail of the vehicle (operation S350) In this case, operation S350 may be performed by the communicator 820 according to control by the processor 810. Furthermore, the received value of communication period may be a value set so that a moving range of the vehicle during the communication period corresponds to a reference value.

Subsequently, in the operation method 900, when the communication period corresponding to the received value arrives, first information corresponding to a current time point is transmitted to the server 500 (operation S960). Operation S960 may be performed by the communicator 820 according to control by the processor 810. Furthermore, operation S960 may correspond to operation S380 of FIG. 3 or operation S755 of FIG. 7B.

In detail, in the operation method 900, first information that is newly obtained during a current communication period may be transmitted to the server 500 during the current communication period. In detail, the processor 810 of the vehicle electronic device 800 may update and obtain the first information during the current communication period. The processor 810 may then control the updated first information to be transmitted to the server 500 at a time point corresponding to the end of the current communication period. Referring to FIG. 7B, the processor 810 may transmit the first information newly obtained during the first communication period to the server 500 before the time point t2 when the first communication period ends.

In certain embodiments, the vehicle electronic device 800 can detect an accident, based on various sensors in the vehicle. When the vehicle electronic device 800 detects an accident, the vehicle electronic device 800 can transmit a signal to the server 500 explicitly notifying the server 500 that the vehicle has been in an accident. Alternatively, the vehicle electronic device 800 can place a phone call directly to a first responder indicating the occurrence of an accident. However, if the vehicle electronic device 800 is destroyed in the accident, the failure of the vehicle electronic device 500 to transmit first information to the server 500, causes the server 500 to perform an accident handling procedure.

Figure 10:
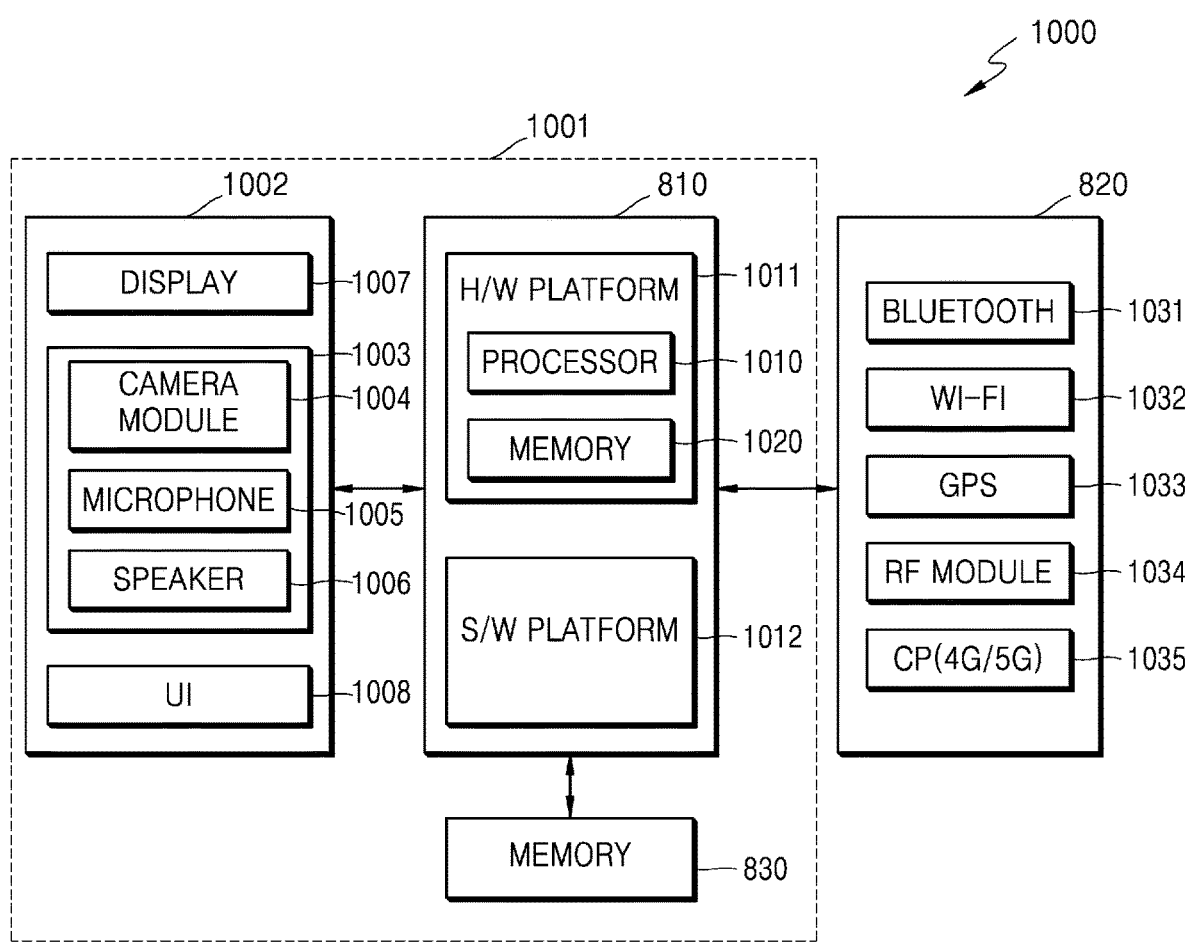
FIG. 10 is another block diagram of a configuration of a vehicle electronic device according to an embodiment of the disclosure.

FIG. 10 is another block diagram of a configuration of a vehicle electronic device 1000 according to an embodiment of the disclosure. The vehicle electronic device 1000 of FIG. 10 corresponds to the vehicle electronic device 800 according to the embodiment of the disclosure described with reference to FIG. 8. Thus, descriptions of the vehicle electronic device 800, which are already provided above with respect to FIG. 8, will be omitted from the description of the vehicle electronic device 1000. In describing the vehicle electronic device 1000 of FIG. 10, the same components as those shown in FIG. 8 are represented by the same reference numerals and names as in FIG. 8

Referring to FIG. 10, the vehicle electronic device 1000 may include a processor 810, an input/output (I/O) interface 1002, and a communicator 820.

Specifically, the vehicle electronic device 1000 may be an electronic device for realizing an in-vehicle infotainment (IVI) technology. The processor 810 and the I/O interface 1002 may be collectively referred to as an IVI head unit. In addition, the vehicle electronic device 1000 may be placed between a drivers seat and a central front portion of a passenger seat in the vehicle. In-vehicle infotainment will be hereinafter abbreviated as 'IVI'.

An IVI system is a system that displays various types of information available from the vehicle, such as radio, navigation, voice commands, and automatic safety diagnosis, so that users (drivers and/or passengers) may easily and conveniently recognize or use the displayed information. Furthermore, infotainment is a term that combines information and entertainment, and may collectively refer to both information and entertainment. In other words, the IVI system may be a system that allows a driver of the vehicle to utilize necessary information in a convenient and pleasant manner while delivering entertainment to the driver. Thus, the IVI system is being developed and improved to increase user convenience.

In an embodiment of the disclosure, determination of a vehicle accident is directly related to vehicle safety, and may be performed via the IVI system in order to increase user convenience and safety.

The communicator 820 may also be referred to as a transmission control unit (TCU).

In this case, a TCU is a component for controlling transmission and reception of data in the vehicle and may be responsible for communication between the vehicle and an external electronic device (e.g., a server, a mobile device, etc.).

Furthermore, the processor 810 may include components 1011 for implementing a hardware platform (e.g., an AP, a memory, etc.) and components 1012 for implementing a software platform (an OS program, automotive safety software, an application, etc.).

In detail, the components 1011 for implementing the hardware platform may include at least one AP 1010 and a memory 1020. Here, the memory 1020 may be configured as the memory 830 described with reference to FIG. 8. Furthermore, the AP 1010 may include an Exynos AP (e.g., Exynos 8870).

Furthermore, the components 1011 for implementing the hardware platform may further include a universal serial bus (USB) module (not shown), a frequency modulation (FM)/ digital multimedia broadcasting (DMB) tuner (not shown), etc. In this case, the USB module may include a USB insert (not shown) to read data from an inserted USB drive. Furthermore, the FM/DMB tuner may selectively receive an FM/DMB broadcasting signal. In detail, the FM/DMB tuner may tune and select a frequency of a channel to be received by the vehicle electronic device 800 from among multiple radio wave components of a broadcasting signal received wirelessly via amplification, mixing, and resonance. A broadcast signal received by the FM/DMB tuner may include audio, video, and additional information (e.g., an electronic program guide (EPG)).

The components 1012 for implementing the software platform may include an OS program, automotive safety software, an application, etc. In this case, the OS program may include a QNX, Linux, or Android-based OS program.

In an embodiment of the disclosure, the components 1012 for implementing the software platform may include software that performs the operations illustrated FIG. 9, which are operations required to determine the occurrence of an accident involving the vehicle.

The I/O interface 1002 is a component for providing data to a user or receiving a user request, and may include at least one of a display 1007, a camera module 1003, or a user interface (UI) 1008.

The camera module 1003 is a component for obtaining image and audio data, and may include a camera 1004 and a microphone 1005. The camera module 1003 may further include a speaker 1006 to output an operation sound of the camera 1004, etc. Further, the speaker 1006 is a separate component independent from the camera module 1003 and may perform an audio output operation. In addition, the camera module 1003 may operate as a detection sensor for recognizing a users gesture and voice.

In detail, the camera 1004 may receive an image (e.g., consecutive frames) corresponding to a user's motion including his or her gesture performed within a recognition range of the camera 1004. For example, the recognition range of the camera 1004 may be within 0.1 m to 5 m from the camera 1004 to the user. For example, the user's motion may include a motion of a user's body part or a part of the user such as the users face, facial expression, hand, fist, finger, etc. The camera 1004 may convert the received image into an electrical signal for recognition according to control by the processor 810, and the processor 810 may select a menu displayed in the vehicle electronic device 1000 based on a recognition result corresponding to the user's motion or perform control corresponding to the recognition result. For example, the processor 810 may control channel selection, channel change, volume adjustment, and execution of available services, etc., by using the recognition result obtained from the camera 1004.

The microphone 1005 may receive a voice signal. The microphone 1005 may receive a users voice signal, and the processor 810 may recognize a control command corresponding to a voice received from the microphone 1005 and control an operation corresponding to the control command to be performed.

The UI 1008 may receive a user input for controlling the vehicle electronic device 1000. The UI 1008 may include a push button, a wheel, a keyboard, a jog dial, a touch panel, and a haptic sensor, etc., for receiving a user input.

The communicator 820 may include at least one of a Bluetooth module 1031, a Wi-Fi module 1032, a GPS module 1033, an RF module 834, or a communication processor (CP) module 1035. Here, the CP module is a modem chipset and may communicate with an external electronic device via a communication network conforming to a 3G, 4G, or 5G communication standard. The communicator 820 may further include at least one communication module (not shown) for performing communication according to communication standards such as BLE, NFC/RFID, Wi-Fi Direct, UWB, and/or ZIGBEE.

In an embodiment of the disclosure, the CP module 1035 may be responsible for communication with the server 500.

Furthermore, the GPS module 1033 receives radio waves emitted by an artificial satellite for automatic vehicle location tracking to identify a location of the vehicle. In detail, the processor 810 may obtain location information of the vehicle based on a radio wave received from the GPS module 1033.

Furthermore, components included in the vehicle electronic device 800, e.g., the processor 810, the I/O interface 1002, and the communicator 820, may communicate with one other over a vehicle network. In addition, the vehicle electronic device 1000 may communicate with other components in a vehicle (not shown) via a vehicle network. In this case, the vehicle network may be a network conforming to a controller area network (CAN) and/or a media oriented systems transport (MOST).

Figure 11:
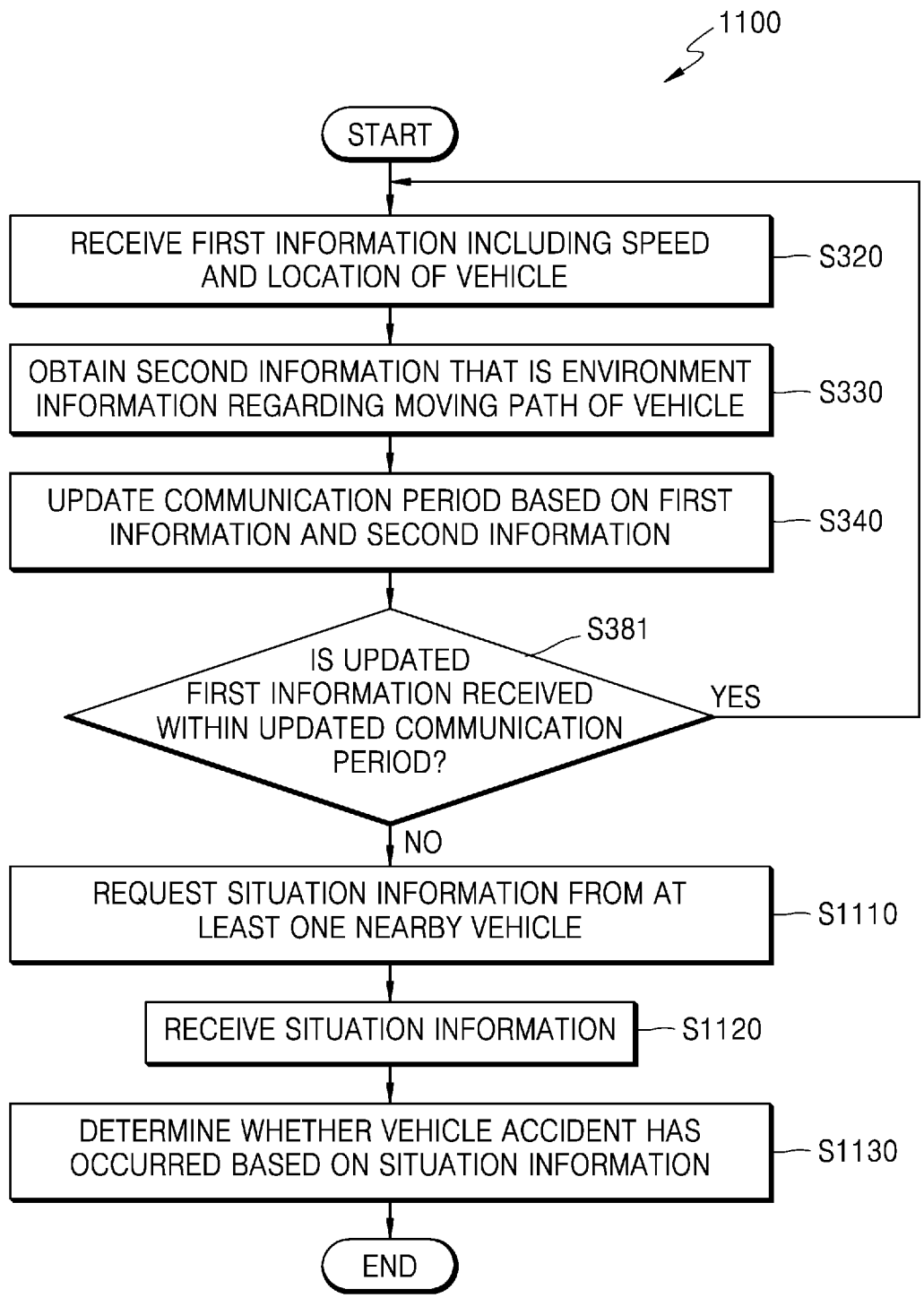
FIG. 11 is another flowchart of a method of determining a vehicle accident, according to an embodiment of the disclosure.

FIG. 11 is another flowchart of a method of determining a vehicle accident, according to an embodiment of the disclosure. Furthermore, FIG. 11 is a flowchart illustrating operations performed by a server, according to an embodiment of the disclosure. In detail, FIG. 11 is a flowchart illustrating operations performed by the server 100 or 500 to determine whether a vehicle accident has occurred, according to an embodiment of the disclosure. Furthermore, in FIG. 11, the same components and operations as in FIG. 7A are illustrated using the same reference numerals, and thus descriptions that are already provided above with respect to FIG. 7A are omitted.

In addition, the operations illustrated in FIG. 11 are described with reference to the operations of the server 500 of FIG. 5. Furthermore, a vehicle referred to in a vehicle accident determination method 1100 of FIG. 11 corresponds to the vehicle 150 shown in FIG. 3.

Referring to FIG. 11, in a vehicle accident determination method 1100, it is determined whether updated first information is received within the updated communication period (operation S381).

Subsequently, when it is determined in operation S381 that the updated first information is not received from the vehicle 150 within the updated communication period, the server 500 may request situation information from at least one nearby vehicle based on the first information (operation S1110). In this case, operation S1110 may be performed by the communicator 520 according to control by the processor 510.

The server 500 may receive, in response to the request in operation S1110, the situation information from at least one of the at least one nearby vehicle (operation S1120). In this case, operation S1120 may be performed by the communicator 520 according to control by the processor 510.

Subsequently, it may be determined whether an accident involving the vehicle 150 has occurred based on the situation information received in operation S1120 (operation S1130). In this case, operation S1120 may be performed by the processor 510.

In detail, in operation S1110, the server 500 may request situation information from at least one nearby vehicle based on first information received in a communication period immediately preceding the updated communication period. Referring to FIG. 7B, the updated communication period is the second communication period, and when the updated first information is not received within the second communication period (specifically, before time point t3), the server 500 may estimate a location of the vehicle 150 based on the first information received in the first communication period (specifically, the first information received in operation S755), which is the immediately preceding communication period.

For example, a maximum distance that the vehicle 150 is able to move during the second communication period may be calculated by using the speed and location of the vehicle 150 included in the first information. Accordingly, it is possible to estimate, based on the first information, a radius within which the vehicle is predicted to be located when the second communication period elapses.

Thus, in operation S1110, the processor 510 of the server 500 may request transmission of situation information from at least one vehicle located within a radius where the vehicle is predicted to be located based on the first information. In this case, the situation information may include information indicating a driving environment on a trail of a nearby vehicle. Specifically, when the nearby vehicle is travelling, the situation information may include captured images of a front and/or a rear of the nearby vehicle, such as black box recordings. In addition, the situation information may include information indicating whether an accident has occurred around a driver of the nearby vehicle.

Hereinafter, a request and reception of situation information will be described in more detail with reference to FIG. 12.

Figure 12:
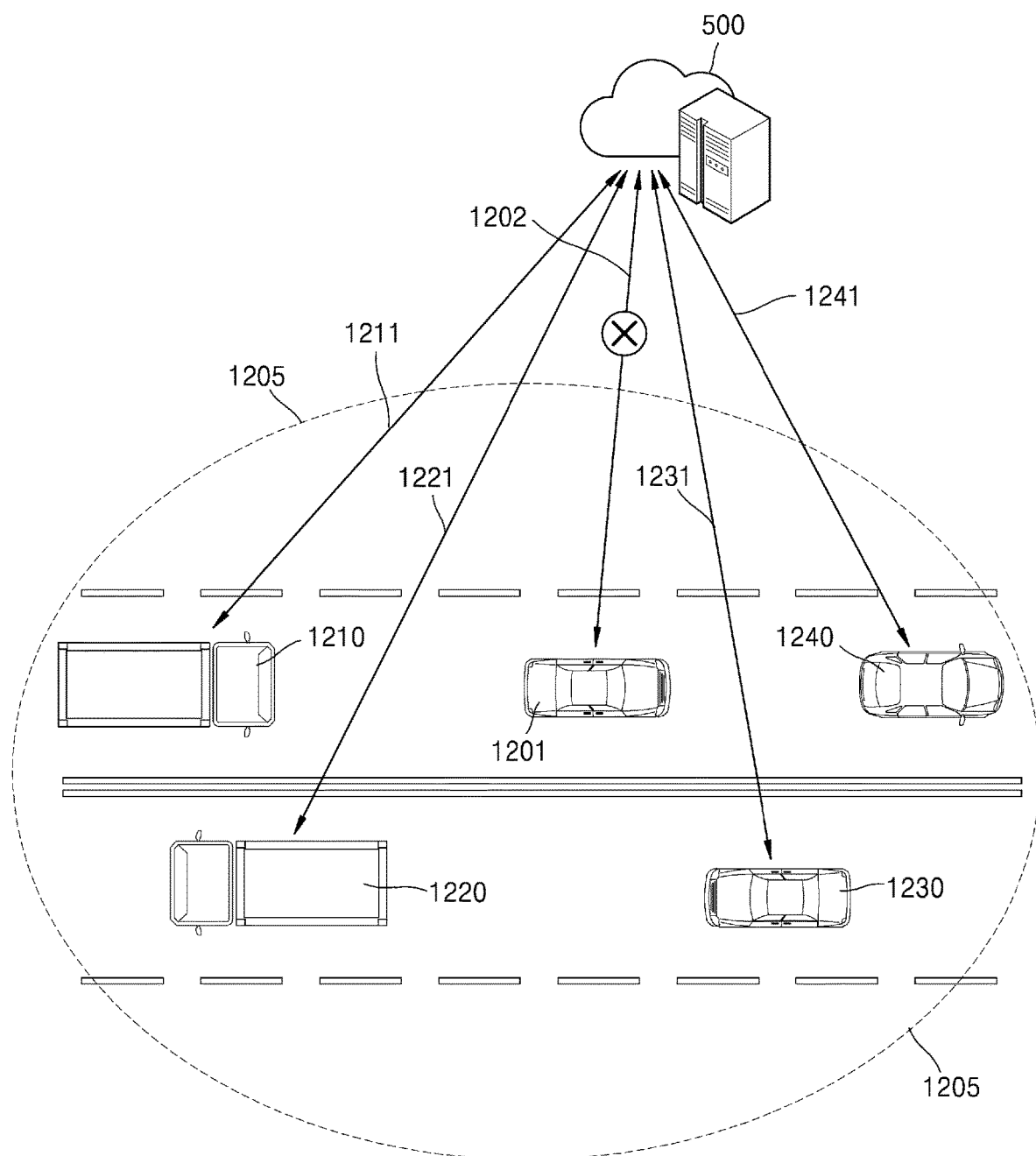
FIG. 12 is a diagram for describing a communication operation between a server and vehicles, according to an embodiment of the disclosure.

FIG. 12 is a diagram for describing a communication operation between a server and vehicles, according to an embodiment of the disclosure.

Referring to FIG. 12, a vehicle 1201 represents a vehicle that fails to transmit updated first information within an updated communication period. A radius 1205 represents a range in which the vehicle 1201 is predicted to be located as described above. In other words, FIG. 12 shows a situation where a communication connection 1202 between the vehicle 1201 and the server 500 is interrupted.

The server 500 may transmit a request for situation information to at least one vehicle 1210, 1220, 1230, and 1240 located within the radius 1205 (operation S1110). In detail, when the server 500 respectively maintains communication connections 1211, 1221, 1231, and 1241 with the at least one vehicle 1210, 1220, 1230, and 1240 like the vehicle 1201, the server 500 may request situation information from the at least one vehicle 1210, 1220, 1230, and 1240. For example, when the vehicle 1210 has maintained the communication connection 1211 with the server 500, the server 500 may transmit a request for situation information to the vehicle 1210 via the communication connection 1211.

Alternatively, the server 500 may transmit a request for situation information to the at least one vehicle 1210, 1220, 1230, and 1240 by using a broadcasting method. In this case, broadcasting may be a communication method by which signals are randomly transmitted to vehicles located within the radius 1205. In this case, the at least one vehicle 1210, 1220, 1230, and 1240 may each receive a broadcast request for situation information.

Accordingly, the server 500 may receive the situation information from the at least one vehicle 1210, 1220, 1230, and 1240 that are nearby vehicles (operation S1120).

After receiving the situation information from the at least one vehicle 1210, 1220, 1230, and 1240, the server 500 may determine, based on the received situation information, whether an accident involving the vehicle 1201 has occurred (operation S1130). For example, when the received situation information is an image captured from a front of the vehicle 1210, the image may include a scene of the accident involving the vehicle 1201. In this case, the server 500 may receive the image including the scene of the accident involving the vehicle 1201 and determine what type of accident involving the vehicle 1201 has occurred. Accordingly, the server 500 may proceed with relief measures for the vehicle 1201 involved based on the received situation information.

As another example, when the received situation information is an image captured from the front of the vehicle 1210, the image may include a scene showing the vehicle 1201 travelling normally. In this case, the server 500 may determine that an accident involving the vehicle 1201 has not occurred and retry to communicate with the vehicle 1201.

Figure 13:
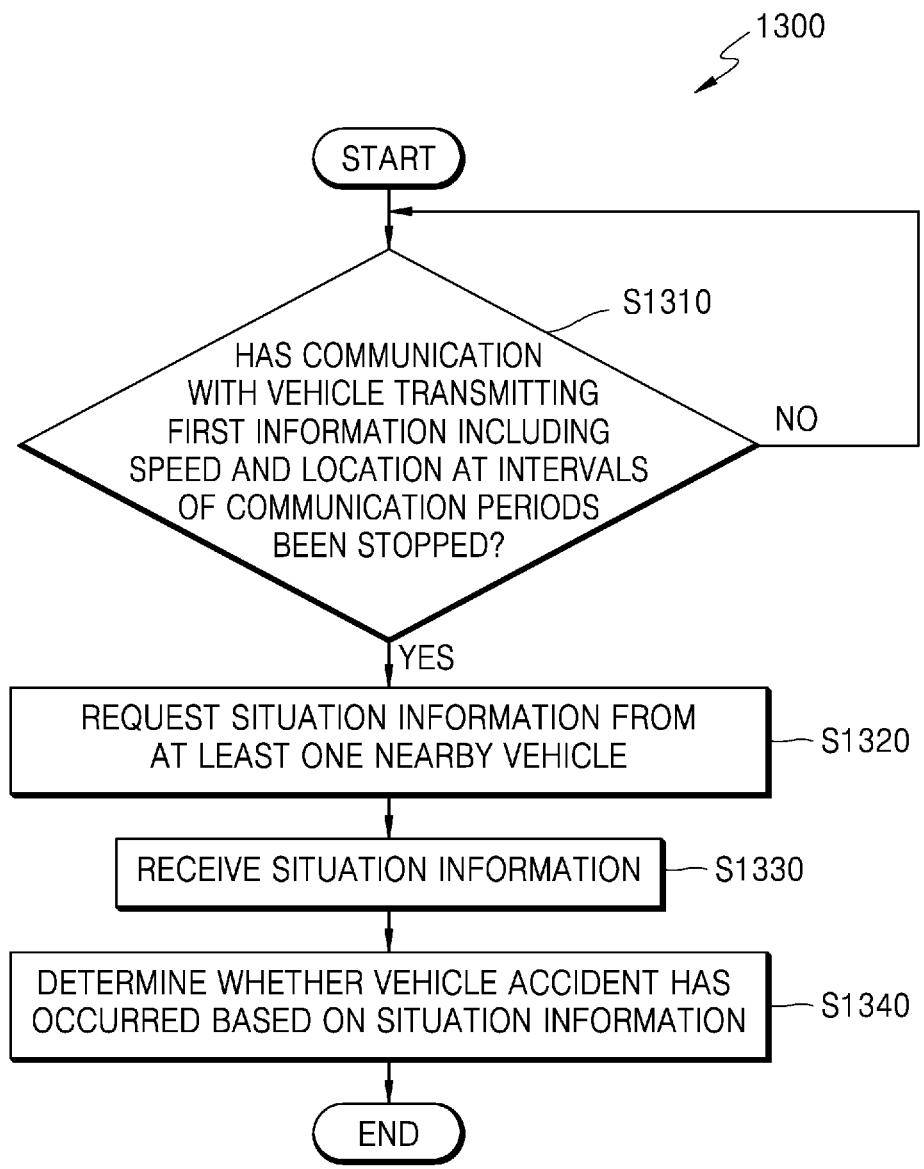
FIG. 13 is another flowchart of a method of determining a vehicle accident, according to an embodiment of the disclosure.

FIG. 13 is another flowchart of a method of determining a vehicle accident, according to an embodiment of the disclosure. Furthermore, FIG. 13 is a flowchart illustrating operations performed by a server, according to an embodiment of the disclosure. In detail, FIG. 13 is a flowchart illustrating operations performed by the server 100 or 500 to determine whether a vehicle accident has occurred, according to an embodiment of the disclosure. Furthermore, because operations S1310, S1320, S1330, and S1340 in FIG. 13 respectively correspond to operations S381, S1110, S1120, and S1130 in FIG. 11, descriptions that are already provided above with respect to FIG. 11 are omitted.

In addition, the operations illustrated in FIG. 13 are described with reference to the operations of the server 500 of FIG. 5. Furthermore, a vehicle referred to in a vehicle accident determination method 1300 of FIG. 13 corresponds to the vehicle 150 shown in FIG. 3.

Referring to FIG. 13, in the vehicle accident determination method 1300, it is determined whether communication with the vehicle 150 transmitting first information including a speed and a location of the vehicle 150 at intervals of communication periods has been stopped (operation S1310). Here, operation S1310 may be performed by the processor 510. In addition, operation S1310 may correspond to operation S381 of FIG. 11. Here, the communication period may be a communication period that is continuously updated.

In detail, when the first information is not received within the communication period, the processor 510 of the server 500 may determine that the communication with the vehicle 150 has been stopped.

In the vehicle accident determination method 1300, when it is determined in operation S1310 that the communication has been stopped, a request for situation information may be transmitted to at least one nearby vehicle based on the first information (operation S1320). In this case, operation S1320 may be performed by the communicator 520 according to control by the processor 510.

The server 500 may receive, in response to the request in operation S1320, the situation information may be received from at least one of the at least one nearby vehicle (operation S1330). In this case, operation S1330 may be performed by the communicator 520 according to control by the processor 510.

Subsequently, it may be determined, based on the situation information received in operation S1330, whether an accident involving the vehicle 150 has occurred (operation S1340). In this case, operation S1340 may be performed by the processor 510.

As described above, a method of determining a vehicle accident, a server device for performing the method, and a vehicle electronic device and an operation method thereof according to embodiments of the disclosure are capable of continuously updating a period of communication between a vehicle and a server based on first information including a speed and a location received from the vehicle and performing communication between the vehicle and the server according to the updated communication period. Furthermore, according to an embodiment of the disclosure, by determining whether an accident has occurred based on whether based on whether transmission and reception of the first information are normally performed between the vehicle and the server, the server may quickly determine whether the accident has occurred even in a situation in which the vehicle is unable to notify the outside about the occurrence of the accident.

A vehicle accident determination method and an operation method of a vehicle electronic device according to embodiments of the disclosure may be respectively implemented in the form of program instructions executable by various types of computers and recorded on computer-readable recording media. Furthermore, according to an embodiment of the disclosure, computer-readable recording media having recorded thereon one or more programs including instructions for respectively executing the vehicle accident determination method and the operation method may be provided.

The computer-readable recording media may include program instructions, data files, data structures, etc., either alone or in combination. The program instructions recorded on the computer-readable recording media may be designed and configured specially for the present disclosure or may be known to and be usable by those skilled in the art of computer software. Examples of the computer-readable recording media include magnetic media such as hard disks, floppy disks, and magnetic tapes, optical media such as compact disk-ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also higher level language code executable by a computer using an interpreter or the like.

In this case, a computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer for temporarily storing data.

According to an embodiment, methods according to certain embodiments of the present disclosure may be included in a computer program product when provided. The computer program product may be traded, as a product, between a seller and a buyer. The computer program product may be distributed in the form of a computer-readable storage medium (e.g., CD-ROM) or distributed (e.g., downloaded or uploaded) on-line via an application store (e.g., Google™, Play Store™) or directly between two user devices (e.g., smartphones). For online distribution, at least a part of the computer program product may be at least transiently stored or temporally generated in the machine-readable storage medium such as a memory of a server of a manufacturer, a server of an application store, or a relay server.

In detail, the vehicle accident determination method and the operation method of the vehicle electronic device he according to the embodiments of the disclosure may be each implemented as a computer program product including a recording medium having stored therein a program for performing operations of: obtaining a sentence in multiple languages; and using a multilingual translation model to obtain vector values respectively corresponding to words in the multilingual sentence, convert the obtained vector values to vector values corresponding to a target language, and obtain a sentence in the target language based on the resulting vector values.

A vehicle accident determination method, a server device for performing the vehicle accident determination method, and a vehicle electronic device and operation method thereof according to embodiments of the disclosure allow an external agency to determine whether the accident has occurred even in a situation where the vehicle is unable to notify the external agency about the occurrence of the accident.

In detail, the vehicle accident determination method, the server device for performing the vehicle accident determination method, and the vehicle electronic device and operation method thereof according to the embodiments of the disclosure allow an external agency to determine, based on communication between a server and a vehicle, whether the accident has occurred even in a situation where the vehicle is unable to notify the external agency about the occurrence of the accident.

While embodiments of the disclosure have been particularly described above, it will be understood that the scope of the disclosure is not limited to the embodiments thereof and various changes and modifications made by one of ordinary skill in the art based on the basic concept of the disclosure also fall within the scope as defined by the following claims.

What is claimed is:

1. A method of determining a vehicle accident, the method comprising:
   receiving, from a vehicle, first information including a speed and a location of the vehicle for a communication period having variable value;
   obtaining second information including environment information of a trail of the vehicle;
   updating the communication period based on the first information and the second information such that a moving range of the vehicle during the communication period corresponds to a reference value;
   determining whether an accident involving the vehicle has occurred based on whether updated first information is received from the vehicle for the updated communication period; and
   transmitting a notification, responsive to determining an accident involving the vehicle.

2. The method of claim 1, wherein the second information includes information about a driving environment on the trail of the vehicle.

3. The method of claim 2, wherein the second information includes at least one of weather, presence of a shaded area, road conditions, information about occurrence of an accident, information about an accident-prone area, or information about driving conditions that correspond to the trail of the vehicle.

4. The method of claim 1, wherein the updating of the communication period comprises updating the communication period with a value that is inversely proportional to the speed of the vehicle such that the moving range of the vehicle during the communication period corresponds to the reference value.

5. The method of claim 1, wherein the updating of the communication period comprises:
   setting an initial communication period to a value that is inversely proportional to the speed of the vehicle such that the moving range of the vehicle during the communication period corresponds to the reference value; and
   setting a final communication period by applying a weight to the initial communication period based on the second information.

6. The method of claim 1, wherein the determining of whether an accident involving the vehicle has occurred comprises, when the updated first information is not received within the updated communication period, determining that an accident involving the vehicle has occurred.

7. The method of claim 1, further comprising, wherein transmitting the notification comprises transmitting information about the occurrence of the accident to a first responder.

8. The method of claim 1, wherein the determining of whether an accident involving the vehicle has occurred comprises:
   determining whether the updated first information is received within the updated communication period;
   when the updated first information is not received within the updated communication period, requesting situation information from at least one nearby vehicle based on the first information;
   receiving the situation information from at least one of the at least one nearby vehicle; and
   determining, based on the situation information, whether an accident involving the vehicle has occurred.

9. The method of claim 8, wherein the situation information includes information indicating a driving environment on a trail of the at least one nearby vehicle.

10. A server device comprising:
    a communicator configured to communicate with a vehicle; and
    a processor configured to execute at least one instruction to:
    update, based on first information including a speed and a location of the vehicle, received from the vehicle for a communication period having variable value, and second information that is environment information regarding a trail of the vehicle, the communication period such that a moving range of the vehicle during the communication period corresponds to a reference value, and control the communicator to transmit the updated communication period to the vehicle;
    determine whether an accident involving the vehicle has occurred based on whether updated first information is received from the vehicle for the updated communication period; and
    transmit a notification, responsive to determining an accident involving the vehicle.

11. The server device of claim 10, wherein the second information includes at least one of weather, information about a shaded area, road conditions, information about occurrence of an accident, information about an accident-prone area, or information about driving conditions, corresponding to the trail of the vehicle.

12. The server device of claim 10, wherein the processor is further configured to execute the at least one instruction to update the communication period with a value that is inversely proportional to the speed of the vehicle such that the moving range that correspond to the reference value.

13. The server device of claim 10, wherein the processor is further configured to execute the at least one instruction to:

set an initial communication period to a value that is inversely proportional to the speed of the vehicle such that the moving range of the vehicle during the communication period is maintained at a value corresponding to the reference value; and set a final communication period by applying a weight to the initial communication period based on the second information.

14. The server device of claim 10, wherein the processor is further configured to execute the at least one instruction to:

determine whether the updated first information is received within the updated communication period;

when the updated first information is not received within the updated communication period, request situation information from at least one nearby vehicle based on the first information;

control the communicator to receive the situation information from at least one of the at least one nearby vehicle; and determine, based on the situation information, whether the accident involving the vehicle has occurred.

15. The server device of claim 10, further comprising a database (DB) storing a plurality of reference values respectively corresponding to a plurality of speeds.

16. The server device of claim 10, wherein the processor is further configured to execute the at least one instruction to calculate the communication period such that the moving range of the vehicle during the communication period corresponds to the reference value by receiving the first information and the second information and performing computation via a neural network.

* * * * *